(12) United States Patent
Narla et al.

(10) Patent No.: US 10,644,510 B2
(45) Date of Patent: May 5, 2020

(54) MULTIPLE ENERGY STORAGE DEVICES FOR INVERTER POWER CONTROL SYSTEMS IN AN ENERGY GENERATION SYSTEM

(71) Applicant: SolarCity Corporation, San Mateo, CA (US)

(72) Inventors: Sandeep Narla, San Jose, CA (US); Andrew Russell Lutkus, Martinez, CA (US)

(73) Assignee: SolarCity Corporation, San Mateo, CA (US)

( * ) Notice: Subject to any disclaimer, the term of this patent is extended or adjusted under 35 U.S.C. 154(b) by 438 days.

(21) Appl. No.: 15/161,118

(22) Filed: May 20, 2016

(65) Prior Publication Data

US 2017/0047741 A1 Feb. 16, 2017

Related U.S. Application Data

(60) Provisional application No. 62/205,452, filed on Aug. 14, 2015.

(51) Int. Cl.
*H02J 3/38* (2006.01)
*H02J 7/35* (2006.01)
(Continued)

(52) U.S. Cl.
CPC ............. *H02J 3/385* (2013.01); *H02J 3/00* (2013.01); *H02J 3/32* (2013.01); *H02J 3/383* (2013.01);
(Continued)

(58) Field of Classification Search
None
See application file for complete search history.

(56) References Cited

U.S. PATENT DOCUMENTS 3,377,539 A 4/1968 Bates
6,307,350 B1 * 10/2001 Alderman ........... H01M 10/425
320/116
(Continued)

FOREIGN PATENT DOCUMENTS

JP 2008 278588 A 11/2008
WO 2011/101030 A1 8/2011
(Continued)

OTHER PUBLICATIONS

International Search Report, dated Oct. 24, 2016, for related international application No. PCT/US2016/046927, 6 pages.
(Continued)

*Primary Examiner* — Jared Fureman
*Assistant Examiner* — Joel Barnett
(74) *Attorney, Agent, or Firm* — Dentons US LLP

(57) ABSTRACT

An energy generation system includes an inverter power control system and a plurality of energy storage devices coupled to the inverter power control system. The inverter power control system includes an input configured to receive DC power; a DC/AC inverter stage configured to receive the DC power input; an anti-islanding relay coupled to the output of the DC/AC inverter stage; and a transition relay coupled to the anti-islanding relay, where the transition relay configured to route an output of the inverter power control system between one or more onsite back-up loads and an AC grid. Each energy storage device is configured to communicate with the inverter power control system.

18 Claims, 18 Drawing Sheets

(51) Int. Cl.
*H02J 3/00* (2006.01)
*H02M 7/00* (2006.01)
*H02J 3/32* (2006.01)
*H02J 7/00* (2006.01)
*H02M 7/44* (2006.01)
*H02M 7/537* (2006.01)
*H02M 1/00* (2006.01)

(52) U.S. Cl.
CPC .......... *H02J 7/007* (2013.01); *H02J 7/0068* (2013.01); *H02J 7/35* (2013.01); *H02M 7/00* (2013.01); *H02J 2003/388* (2013.01); *H02M 7/44* (2013.01); *H02M 7/537* (2013.01); *H02M 2001/007* (2013.01); *H02M 2001/008* (2013.01); *H02M 2001/0067* (2013.01); *Y02E 10/563* (2013.01); *Y02E 10/566* (2013.01); *Y02E 10/58* (2013.01); *Y02E 70/30* (2013.01)

(56) References Cited

U.S. PATENT DOCUMENTS

| | | | |
|---|---|---|---|
| 7,800,247 B2 | 9/2010 | Chang et al. | |
| 8,633,670 B2 | 1/2014 | Choi | |
| 8,716,891 B2 | 5/2014 | Choi | |
| 2001/0056330 A1 | 12/2001 | Wills | |
| 2006/0083039 A1 | 4/2006 | Oliveira et al. | |
| 2009/0066291 A1* | 3/2009 | Tien | H02J 7/0016 320/118 |
| 2011/0133552 A1 | 6/2011 | Binder et al. | |
| 2011/0204635 A1* | 8/2011 | Miller | F03D 7/048 290/44 |
| 2012/0019074 A1* | 1/2012 | Frolov | H02J 3/383 307/82 |
| 2012/0153722 A1 | 6/2012 | Nazarian | |
| 2012/0249078 A1* | 10/2012 | Kim | H02J 3/32 320/134 |
| 2013/0106196 A1 | 5/2013 | Johnson et al. | |
| 2013/0134782 A1 | 5/2013 | Seon | |
| 2013/0181519 A1* | 7/2013 | Lee | H02J 3/28 307/24 |
| 2013/0187473 A1 | 7/2013 | Deboy et al. | |
| 2013/0201737 A1 | 8/2013 | Chiang et al. | |
| 2013/0260198 A1* | 10/2013 | Yokoura | H01M 6/5011 429/91 |
| 2014/0015326 A1 | 1/2014 | Eberhardt et al. | |
| 2014/0062198 A1 | 3/2014 | Luo | |
| 2014/0077768 A1 | 3/2014 | Jung | |
| 2014/0079960 A1 | 3/2014 | Yun | |
| 2014/0203649 A1 | 7/2014 | Cheek et al. | |
| 2015/0076903 A1 | 3/2015 | Kanayama et al. | |
| 2015/0381074 A1 | 12/2015 | Flett | |
| 2016/0233560 A1* | 8/2016 | Kanoh | H01M 10/425 |

FOREIGN PATENT DOCUMENTS

| | | |
|---|---|---|
| WO | 2012/043919 A1 | 4/2012 |
| WO | 2014/020645 A1 | 2/2014 |
| WO | 2015/041249 A1 | 3/2015 |

OTHER PUBLICATIONS

Written Opinion, dated Oct. 24, 2016, for related international application No. PCT/US2016/046927, 8 pages.
International Search Report, dated Nov. 18, 2016, for corresponding International Patent Application No. PCT/US2016/046921, 3 pages.
Written Opinion, dated Nov. 18, 2016, for corresponding International Patent Application No. PCT/US2016/046921, 5 pages.
International Search Report, dated Nov. 30, 2016, for corresponding International Patent Application No. PCT/US2016/046926, 3 pages.
Written Opinion, dated Nov. 30, 2016, for corresponding International Patent Application No. PCT/US2016/046926, 5 pages.
Varela, P., et al.: "Current mode with RMS voltage and offset control loops for a single-phase aircraft inverter suitable for parallel and 3-phase operation modes", Energy Conversion Congress and Exposition (ECCE), 2011 IEEE, IEEE, Sep. 17, 2017 (Sep. 17, 2011), pp. 2562-2567, XP032067504.
Examination Report dated May 23, 2019 for corresponding European Application No. 16754637.3, 5 pages.

\* cited by examiner

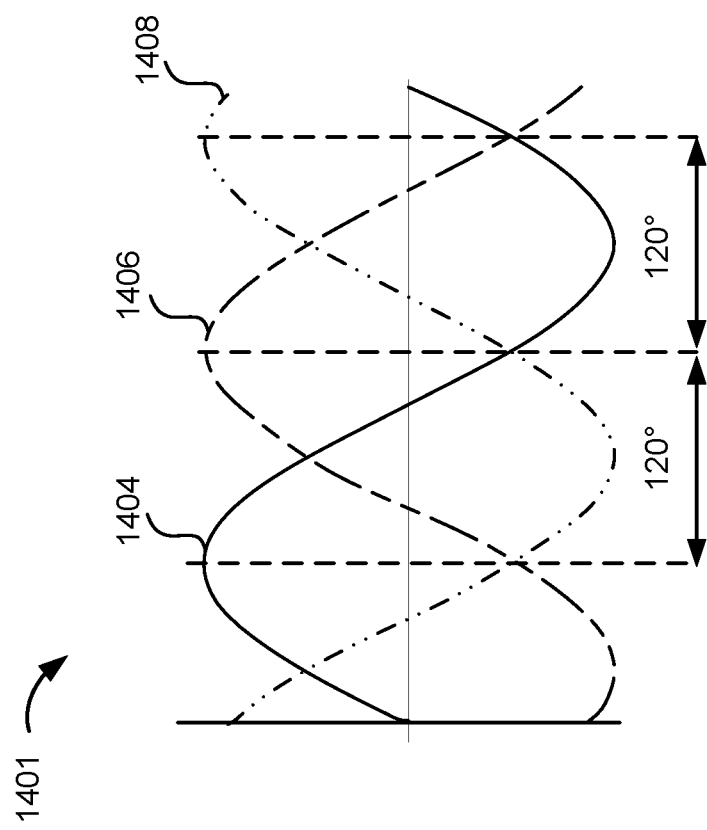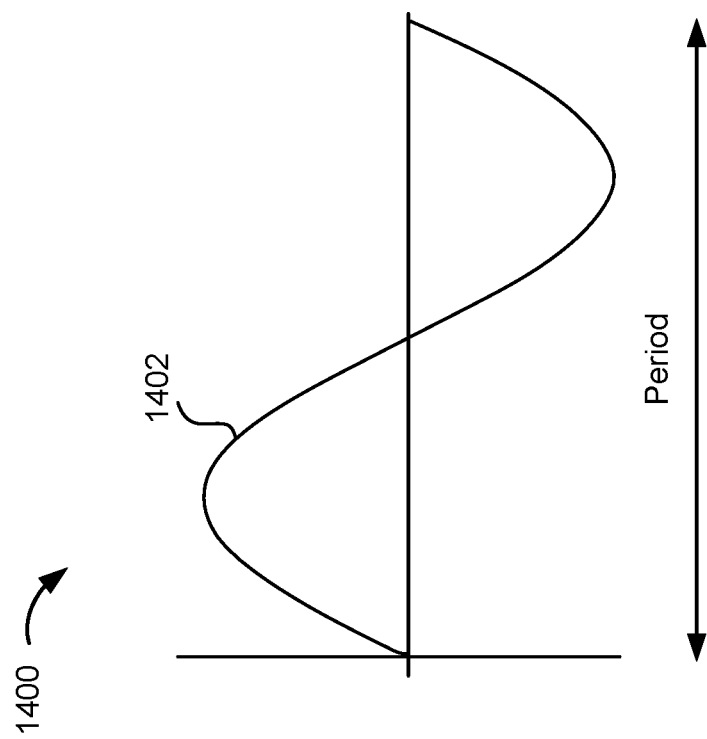
FIG. 14A
FIG. 14B

MULTIPLE ENERGY STORAGE DEVICES FOR INVERTER POWER CONTROL SYSTEMS IN AN ENERGY GENERATION SYSTEM

CROSS-REFERENCES TO RELATED APPLICATIONS

This application claims priority to U.S. Provisional Application No. 62/205,452, filed on Aug. 14, 2015, which is herein incorporated by reference in its entirety for all purposes.

BACKGROUND

Decreasing costs, state and federal tax incentives, and increased awareness of the correlation between greenhouse gasses (e.g., carbon dioxide emissions) and climate change have increased the popularity of photovoltaic (PV) or "solar" energy generation systems with consumers, businesses and utility companies. A conventional solar energy generation system includes an array of PV modules connected together on one or more strings, a combiner for combining direct current (DC) outputs of the one or more strings, one or more string inverters for converting the combined DC output from the strings to alternating current (AC), and a physical interface to AC grid power—typically on the load side of the utility meter, between the meter and the customer's main electrical panel. Alternatively, micro inverters may be used with each panel or N panels (N<=4), obviating the need for a string inverter. The conventional solar energy generation system provides excess AC power back to the AC grid, resulting in cost benefits to the customer.

Conventional solar energy generation systems have been improved to include on-site energy storage. Including energy storage in conventional solar energy generation systems improves the functionality and versatility of such systems. For instance, including on-site energy storage provides a potential source of power when the grid is unavailable, such as when an outage occurs. Additionally, it allows the customer to store the energy generated during the day when the solar array is generating the most power, and then consume that generated power after the sun has set, thereby reducing the customer's peak demand. Distributed storage even has the potential to benefit traditional utilities by allowing their customers to supply power back to the grid at a time when the grid needs additional power, such as to meet mid-day load when active heating or cooling are in use across the grid. Localized energy storage can help utilities stabilize the grid by supplying power to enhance demand response, shaving demand peaks, and shifting loads to times of lower demand. In fact, storage could even take power from the grid instead of the PV system during the middle of the night when supply is high and demand is low. Furthermore, by enabling customers to store energy onsite, it may be possible to bill customers for energy supplied to back-up loads when the grid is unavailable (e.g., during an outage). Managing the operation of such energy generation systems can be very complex. Power can flow between several components in the energy generation system, and successful operation of the energy generation system relies on the absence of conflicting power flow. Given the benefits of solar energy generation systems having on-site energy storage, improvements to the management of power flow in such systems are desired.

SUMMARY

Embodiments describe solar energy generation systems that increase the functionality and versatility of the solar energy generation systems having on-site energy storage. In some embodiments, energy generation systems may have a power control system containing more than one inverter power control system (PCS). The inverter PCSs may not only control the transfer of power between DC sources (e.g., PV array and energy storage devices) and an AC grid and/or back-up loads, but also control the transfer of power between each inverter PCS. One of the inverter PCSs may be configured to manage the operation of the other inverter PCS.

In other embodiments, energy generation systems may have an energy storage system containing a plurality of energy storage devices. The inverter PCS may store energy into, and withdraw energy from, the plurality of energy storage devices within the energy storage system. The energy storage systems may be configured to directly receive commands from the inverter PCS for operating the energy generation system. One of the energy storage devices may be configured to manage the operation of the other energy storage devices within the energy storage system. It is to be appreciated that an energy storage system according to disclosures herein do not include an inverter PCS, but may include one or more energy storage devices and one or more other components.

In yet other embodiments, energy generation systems may have several power subsystems that provide power to different phases of an AC grid. Each power subsystem may include an energy generation device, inverter PCS, and energy storage device that provides power to an AC grid or a back-up load, both of which operate in each phase of the AC power. One of the inverter PCSs of a power subsystem may be configured to manage the operation of other inverter PCSs in other power subsystems of the energy generation system.

In an embodiment, a power control system includes a first inverter power control system and a second inverter power control system coupled in a parallel configuration with the first inverter power control system. Both first and second inverter power control systems may each include an input configured to receive direct current (DC) power; a DC to alternating current (AC) inverter stage configured to receive the DC power input; an anti-islanding relay coupled to the output of the DC/AC inverter stage; and a transition relay coupled to the anti-islanding relay. The transition relay may be configured to route an output of the inverter power control system between one or more onsite back-up loads and an AC grid. The first inverter power control system may be designated as a master that is configured to control the operation of the second inverter power control system designated as a slave.

The first inverter power control system may be configured to control the transition relay of the second inverter power control system. In some embodiments, both of the first and second inverter power control systems further include a DC to DC converter stage configured to receive and step up or step down the DC power input to a level suitable for inversion. The power control system may further include a communication line coupled between the first and second inverter power control systems. In embodiments, the first and second inverter power control systems include a first and second communication device, respectively, the communication line coupling the first communication device to the second communication device. The communication line may be a wireless communication line.

In certain embodiments, an energy generation system may include one or more photovoltaic (PV) strings and a power control system including a plurality of inverter power control systems connected in a parallel configuration and coupled to the one or more PV strings. Each inverter power control system may include an input configured to receive direct current (DC) power; a DC to alternating current (AC) inverter stage configured to receive the DC power input; an anti-islanding relay coupled to the output of the DC/AC inverter stage; a transition relay coupled to the anti-islanding relay, where the transition relay configured to route an output of the inverter power control system between one or more onsite back-up loads and an AC grid, and where one of the plurality of inverter power control systems is designated as a master that is configured to control an operation of another inverter power control system designated as a slave; and one or more energy storage devices coupled to the plurality of inverter power control systems.

The energy generation system may also include a central AC disconnect coupled between the plurality of inverter power control systems and the AC grid. The central AC disconnect may be configured to simultaneously connect and disconnect the plurality of inverter power control systems to the AC grid. In embodiments, the energy generation system may also include a communication line coupling the central AC disconnect with the plurality of inverter power control systems. In some embodiments, one inverter power control system may be configured to control the other inverter power control systems of the plurality of inverter power control systems. Each inverter power control system may further include a DC to DC converter stage configured to receive and step up or step down the DC power input to a level suitable for inversion. In certain embodiments, the energy generation system may also include communication lines coupled between the plurality of inverter power control systems. Each inverter power control system of the plurality of inverter power control systems may include a communication device, where the communication lines couple together the communication devices in the plurality of inverter power control systems. The communication lines may be wireless communication lines.

In some embodiments, a method includes receiving direct current (DC) power at a first inverter power control system and at a second inverter power control system; generating a command at the first inverter power control system; sending the command from the first inverter power control system to the second inverter power control system; and receiving, at the second inverter power control system, the command from the first inverter power control system, the command instructing the second inverter power control system to output power to at least one of a plurality of destinations.

At least a portion of the received DC power at the second inverter power control system may be outputted to an energy storage device. In some embodiments, the command may instruct the second inverter power control system to alter a position of a transition relay in the second inverter power control system. The position of the transition relay may be altered to output power to an AC grid. The position of the transition relay may be altered to output power to on-site back-up loads.

In embodiments, an energy generation system may include an inverter power control system and a plurality of energy storage devices coupled to the inverter power control system, where each energy storage device configured to communicate with the inverter power control system. The inverter power control system may include an input configured to receive DC power; a DC/AC inverter stage configured to receive the DC power input; an anti-islanding relay coupled to the output of the DC/AC inverter stage; and a transition relay coupled to the anti-islanding relay, where the transition relay configured to route an output of the inverter power control system between one or more onsite back-up loads and an AC grid.

The energy generation system may further include a battery combiner box, where the battery combiner box is coupled between the plurality of energy storage devices and the inverter power control system. The battery combiner box may be configured to combine DC power outputted by the plurality of energy storage devices into a DC power bus. The battery combiner box may include one or more disconnection and protection components configured to sever a flow of power between an energy storage device and the inverter power control system. Each of the plurality of energy storage devices may include a DC/DC converter to step up or step down a voltage of the output of the inverter power control system. In some embodiments, the inverter power control system may be communicatively coupled to the plurality of energy storage devices through communication lines arranged in a parallel configuration. The communication lines may be wireless communication lines or power lines though which power is transferred. The inverter power control system may communicate with the plurality of energy storage devices through power line communication.

In certain embodiments, an energy generation system includes an inverter power control system configured to route power between an AC grid and one or more back-up loads; a plurality of PV panels to input DC power to the inverter power control system; and a plurality of energy storage devices coupled to the inverter power control system. The plurality of energy storage devices may include a master energy storage device including a buck-boost circuit and a communication circuit for communicating with the inverter power control system; and at least one slave energy storage device coupled to the master energy storage device, where the at least one slave energy storage device is controlled by the master energy storage device.

The at least one slave energy storage device may be coupled to the master energy device through power lines arranged in a parallel configuration. In embodiments, the at least one slave energy storage device may be coupled to the master energy device through power lines arranged in a serial configuration. Each slave energy storage device may have less components than the master energy storage device. The inverter power control system may be communicatively coupled to the master energy storage device through a communication line.

In certain embodiments, a method includes receiving direct current (DC) power at an inverter power control system; generating commands by a controller in the inverter power control system; sending the commands from the controller to a plurality of energy generation systems through one or more communication lines; and receiving, by the plurality of energy storage devices, the commands from the inverter power control system, the commands instructing the plurality of energy storage devices to charge or discharge according to a charge or discharge scheme. The commands may be sent simultaneously to each energy storage device of the plurality of energy storage devices through the one or more communication lines arranged in a parallel configuration. In some embodiments, the commands may be sent in sequential order to each energy storage device of the plurality of energy storage devices through the one or more communication lines arranged in a serial configuration. The charge or discharge scheme may charge or discharge one energy storage device at a time and in a sequential order. In some embodiments, a transition of power between sequential energy storage devices may include gradually decreasing a power output of one energy storage device while gradually increasing a power output of another energy storage device. In certain embodiments, a transition of power between sequential energy storage devices may include equally charging or discharging each energy storage device of the plurality of energy storage devices at a same rate.

In embodiments, an energy generation system includes a plurality of energy generation devices for generating DC power; a plurality of energy storage devices for storing the generated DC power and discharging stored DC power; and a plurality of single-phase inverters coupled to respective energy generation devices and energy storage devices, where each single-phase inverter of the plurality of single-phase inverters is configured to convert generated DC power or stored DC power to AC power so that the converted AC power of each single-phase inverter is offset by a phase from one another.

One of the plurality of single-phase inverters may be designated as a master and the other single-phase inverters are designated as slaves. The master single-phase inverter may be configured to manage the operation of the slave single-phase inverters. In some embodiments, the plurality of single-phase inverters may be communicatively coupled to one another by communication lines. The communication lines may be wireless communication lines or power lines though which power may be transferred. A frequency and voltage amplitude of each converted AC power from the plurality of single-phase inverters may be equal to one another. The phase may be a third of a period of a waveform of the AC power. In some embodiments, each single-phase inverter may be configured to output the converted AC power to a respective AC grid or a respective back-up load. The respective AC grid may operate at the same frequency, voltage amplitude, and phase as the corresponding single-phase inverter.

In some embodiments, an energy generation system may include a first subsystem including a first inverter power control system (PCS) configured to output alternating AC power in a first phase that may be converted from at least one DC power source; a second subsystem including a second inverter PCS configured to output AC power in a second phase that may be converted from the at least one DC power source; and a third subsystem including a third inverter PCS configured to output AC power in a third phase that may be converted from the at least one DC power source, where the first, second, and third phases may be equally offset in phase from one another.

The first inverter PCS may be designated as a master and the second and third inverter PCSs may be designated as slaves. The first inverter PCS may manage operations of the second and third inverters to establish the offset from one another. In embodiments, The first, second, and third inverter PCSs may be communicatively coupled to one another by communication lines.

In some embodiments, a method includes receiving direct current (DC) power at a first single-phase inverter power control system (PCS), second single-phase inverter PCS, and third single-inverter PCS; generating one or more commands at the first single-phase inverter PCS; sending the one or more commands from the first single-phase inverter PCS to the second and third single-phase inverter PCSs; and receiving, at the second and third single-phase inverter PCSs, the one or more commands from the first single-phase inverter PCS. The one or more commands may instruct the second single-phase inverter PCS to output power to at least one of a plurality of destinations in a second phase, and instruct the third single-phase inverter PCS to output power to at least one of a plurality of destinations in a third phase. The first single-phase inverter PCS may output power to at least one of a plurality of destinations in a first phase.

The one or more commands may instruct the first, second, and third single-phase inverter PCSs to output power in a first, second, and third phase that may be equally offset from one another. In some embodiments, the one or more commands instructs the first, second, and third single-phase inverter PCSs to output power in a first, second, and third phase offset by 120°. The first single-phase inverter PCS may be designated as a master and the second and third single-phase inverter PCSs may be designated as slaves. The one or more commands may be sent through communication lines coupled between the first single-phase inverter PCS and the second and third single-phase inverter PCSs. The communication lines may be arranged in a parallel or serial configuration.

BRIEF DESCRIPTION OF THE DRAWINGS

FIG. 14A is a graph of a waveform for single-phase AC power.

FIG. 14B is a graph of waveforms for three-phase AC power.

DETAILED DESCRIPTION

Recently, inverter power control systems have been developed for charging and discharging power with storage devices that are coupled to on-site power generation systems, on-site loads, and the grid. These systems allow multiple modes of operation whereby a PV solar array can charge the energy storage device or it can supply the harvested energy to an AC grid and/or on-site back-up loads. Alternatively, the energy storage device can supply energy to the AC grid and/or on-site back-up loads, either alone or combined with the solar array as applicable. In another alternative mode, the AC grid can be used to charge the energy storage device. Such systems are described in related U.S. patent application Ser. No. 14/798,069, filed Jul. 13, 2015, as well as U.S. Provisional Patent Application No. 62/151,257, filed Apr. 22, 2015, which are herein incorporated by reference in their entirety for all purposes.

In embodiments, an energy generation system may be specially configured to satisfy demands of an installation site. In a first example, an energy generation system may be configured to output a greater magnitude of power to an AC grid or back-up loads that require a greater amount of power to operate, such as for a large installation site that has many loads (e.g., a villa, commercial building, multi-storied house and the like). In a second example, an energy generation system may be configured to output a defined amount of power for a longer period of time at an installation site that demands an extended energy capacity such as for an installation location at a remote site that does not receive consistent amounts of sunlight. In a third example, an energy generation system may be configured to output power to different phases of an AC grid independently for an installation site that has back-up loads that run on different phases of power. Each of these examples will be explored in more detail further herein.

I. Energy Generation System Configured for Large Power Consumption

In order to provide a greater amount of energy storage capacity and/or greater power, it may be desirable to utilize a plurality of inverter PCSs and/or energy storage devices. For example, according to embodiments, a solar energy generation system may include at least two inverter PCSs with an energy storage device or at least one inverter PCS with two energy storage devices. Each inverter PCS may be configured to receive DC power generated by an energy generation device, such as an array of PV strings. The received DC power may then be either stored in an energy storage device (e.g., battery) or converted and outputted as AC power to an AC grid or a back-up load. According to embodiments, one inverter PCS may be designated as a master, while other inverter PCSs may be designated as slaves. The master inverter PCS may manage the operation of slave inverter PCSs to increase the functionality and versatility of the solar energy generation system as a whole.

Figure 1A:
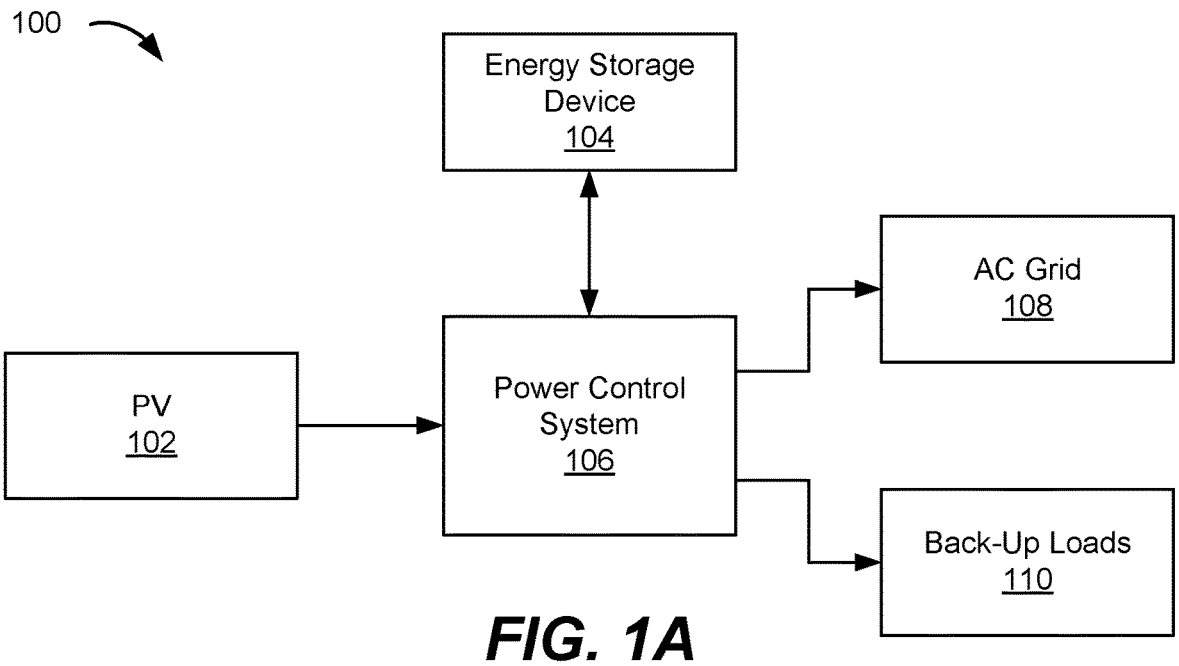
FIG. 1A is a simplified block diagram of an energy generation system including one array of PV strings, inverter PCS, and one energy storage device for outputting to AC grid/back-up loads.

FIG. 1A illustrates a block diagram of an exemplary solar energy generation system 100. One or more energy generation devices, e.g., array of PV strings 102, may generate and output DC power to a power control system 106. Power control system 106 may be coupled to an energy storage device 104 for storing DC energy, and to AC grid 108 and back-up loads 110 for outputting AC power. Energy storage device 104 may be any suitable device capable of storing energy, such as a battery, fuel cell and the like. AC grid 108 may be a utility grid or any other electrical component for interfacing with the utility grid, such as a main panel, transformer, load center, and/or a substation. Back-up loads 110 may be any electrical device that utilizes power, e.g., a residential appliance or a commercial tool. Power control system 106 may be a three-phase or single-phase power control system that outputs power to a corresponding three-phase or single-phase AC grid 108 and/or corresponding three-phase or single-phase back-up loads 110. The operational phase of back-up loads 110 may depend on the operational phase of power control system 106.

In embodiments, an inverter power control system 106 is configured to manage the flow of power between the different components of solar energy generation system 100. As an example, power control system 106 may store DC power outputted from PV strings 102 into energy storage device 104, which may then be discharged at an opportune time to provide DC power that is converted into AC power and outputted into AC grid 108 or back-up loads 110. In other examples, power control system 106 may convert DC power generated by PV strings 102 into AC power and then output that AC power directly to AC grid 108 or back-up loads 110. In yet other examples, power control system 106 may convert a portion of the total DC power from PV strings 102 into AC power for output to AC grid 108 or back-up loads 110, and store the remaining DC power to energy storage device 104.

Managing the flow of power between the components of energy generation system 100 includes managing power flow between one array of PV strings 102, one energy storage device 104 and AC outputs (e.g., AC grid 108 and back-up loads 110). In embodiments where more than one array of PV strings and more than one energy storage device are incorporated in the energy generation system, managing the flow of power between these different components may be more complex.

Figure 1B:
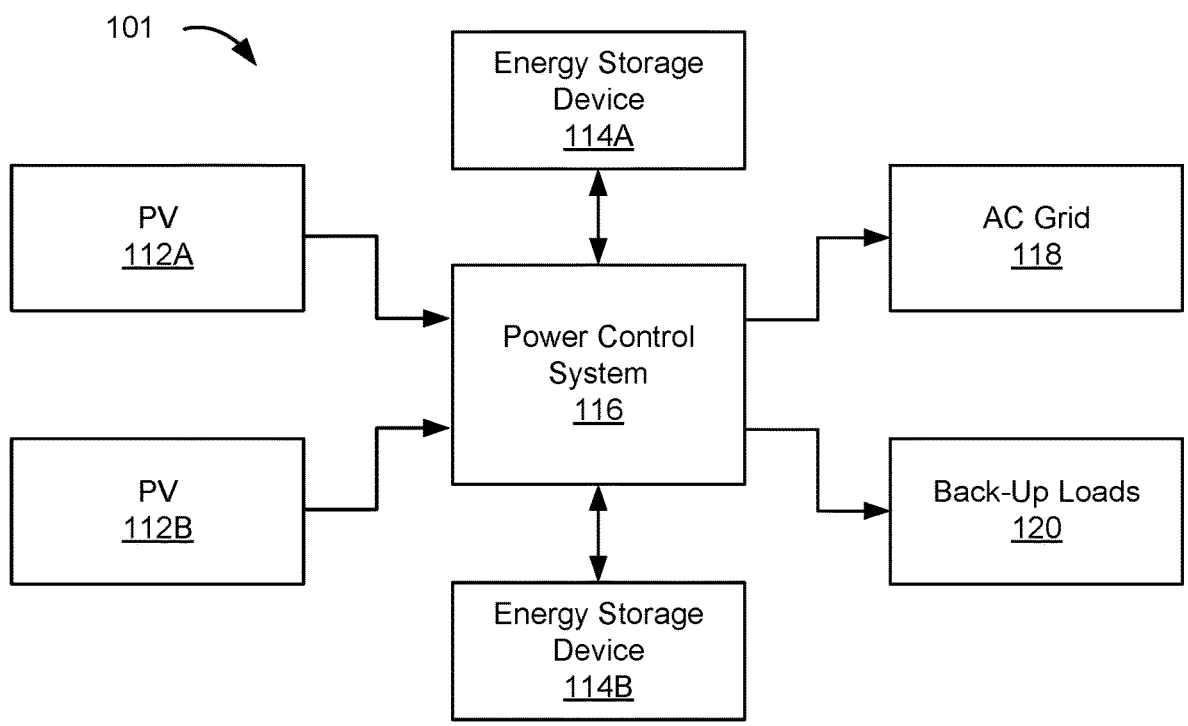
FIG. 1B is a simplified block diagram of an energy generation system including more than one array of PV strings and more than one energy storage device, according to embodiments of the present invention.

FIG. 1B illustrates an exemplary energy generation system 101 having more than one array of PV strings: PV strings 112A and 112B, and more than one energy storage device: energy storage device 114A and 114B. To manage the flow of power in energy generation system 101, power control system 116 needs to route power between more PV strings and energy storage devices than power control system 106 in energy generation system 100 shown in FIG. 1A. Larger numbers of PV strings and energy storage devices greatly increases the complexity and logistics of managing power flow across the energy generation system. Inefficient power flow management may result in under-utilization of the energy generation system and decreased performance, ultimately resulting in monetary losses to the customer.

According to embodiments of the present invention, power control system 114 may include more than one inverter power control system (PCS). The inverter PCSs may work in concert to manage the flow of power across the various components in energy generation system 101. One inverter PCS may be designated as a master inverter PCS and configured to manage the operations of the other inverter PCSs designated as slave inverter PCSs, as will be discussed in detail further herein with respect to FIG. 2.

A. Inverter Power Control System

Figure 2:
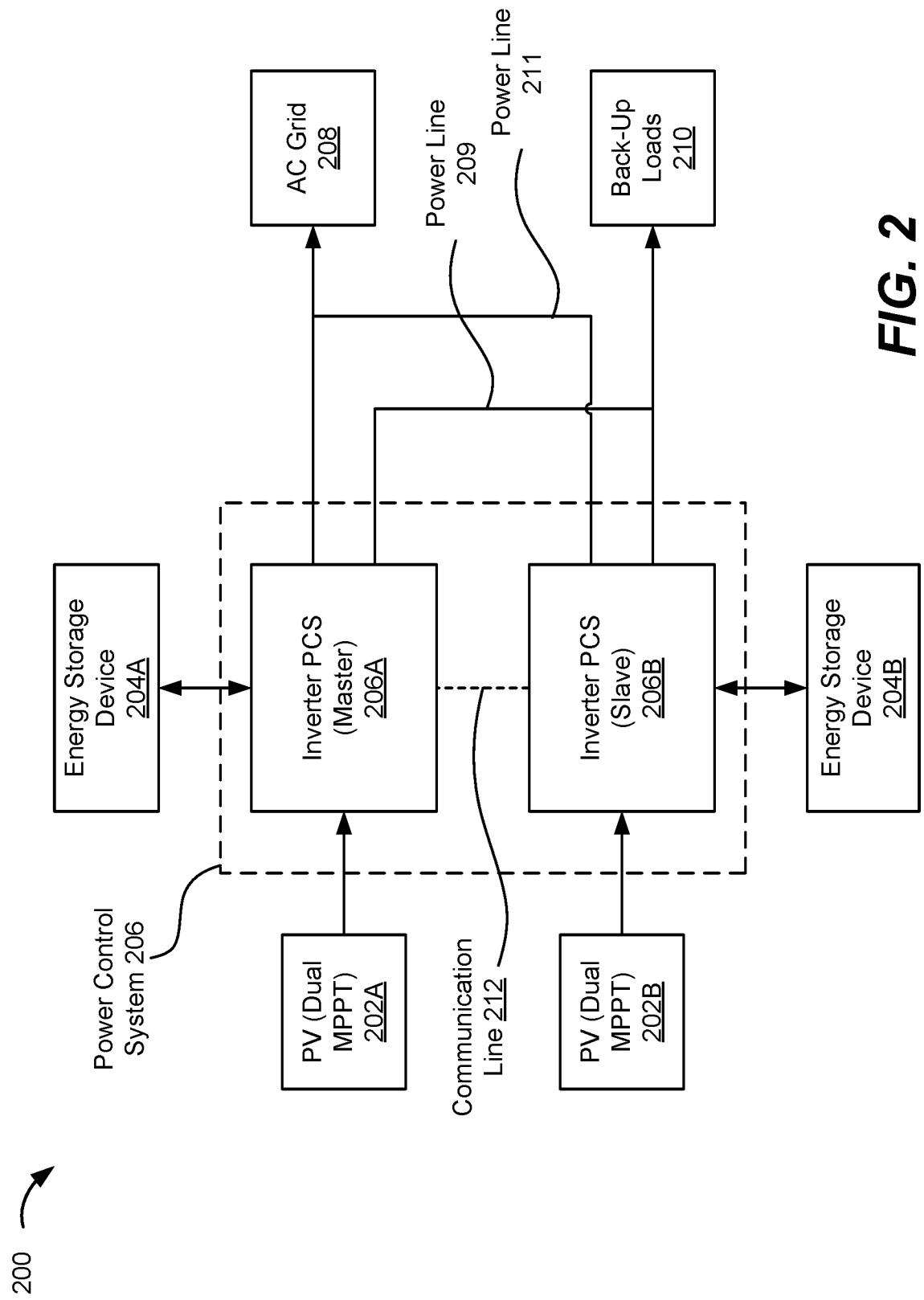
FIG. 2 is a simplified block diagram of an energy generation system including a power control system having two inverter power control systems, according to embodiments of the present invention.

FIG. 2 illustrates an exemplary energy generation system 200 according to embodiments of the present invention. As shown, two arrays of PV strings 202A and 202B are coupled to inputs of respective inverter PCSs 206A and 206B. Each array of PV strings may include a plurality of PV modules (not shown) connected serially and/or in parallel with an additive direct current (DC) voltage somewhere between 100 and 1000 volts, depending on such factors as the number of panels, their efficiency, their output rating, ambient temperature and irradiation on each panel. Also, each array of PV strings may include a maximum power-point tracking (MPPT) system for maximizing the power output of each array of PV strings under different voltage conditions. In some embodiments, each MPPT system may receive the output of one or more separate strings connected in parallel (i.e., a two (or more)-to-one combiner at each MPPT channel input), thus resulting in a dual MPPT system as shown in FIG. 2.

In some embodiments, when the high voltage DC line from each string is received at input of a respective inverter, it is subject to maximum power-point tracking (MPPT) at the string level (e.g., dual MPPT in the exemplary system of FIG. 2). Alternatively, each module, or a number of individual modules in the respective strings, may include a DC optimizer that performs MPPT at the module level or N-module level output, rather than at the string level. The various embodiments are compatible with either centralized or distributed MPPT.

Inverter PCS 206A and 206B may each be coupled to respective energy storage devices 204A and 204B, for storing DC power generated by PV strings 202A and 202B, or for receiving discharged power from energy storage devices 204A and 204B. It should be appreciated that energy storage devices 204A and 204B in FIG. 2 may be an exemplary commercially available residential lithium ion battery pack with only its own battery or with its own battery in addition to a DC/DC buck-boost converter or other topologies. The battery may be a lead acid battery, advanced lead acid battery, flow battery, organic battery, or other battery type. The various embodiments disclosed herein are compatible with numerous different battery chemistries. Various disclosed embodiments will work with other commercially available energy storage devices as well; however, the embodiments may have particular utility for systems that use high voltage energy storage devices (e.g., >48 volts) such as 48V-1000V battery packs.

Energy generation system 200 may include power control system 206 configured to efficiently manage the power flow between PV strings 202A and 202B, energy storage devices 204A and 204B, AC grid 208, and loads 210. In embodiments, power control system 206 may be configured to include more than one inverter PCS, e.g., inverter PCSs 206A and 206B, coupled together in a parallel configuration, where each inverter PCS is coupled to a respective array of PV strings and an energy storage device. An inverter PCS may be different than a conventional inverter in that inverter PCS may include device components that enable the inverter PCS to communicate and interact with other inverter PCSs, as will be discussed further herein. Outputs of both inverter PCSs 206A and 206B may combine together and be outputted to AC grid 208 or back-up loads 210. Having more than one inverter in energy generation system 200 allows energy generation system 200 to provide more power to AC grid 208 or back-up loads 210. This may be especially useful in situations where energy generation system 200 is installed at a location that consumes a lot of power, such as a large building (e.g., a resort, villa, or a commercial building).

Having multiple inverter PCSs may result in a more complex energy generation system. It may be necessary to coordinate the power flow into and out of power control system 206 in such a way that maximizes the functionality, versatility, and return on the investment of energy generation system 200. Thus, according to embodiments of the present invention, one inverter PCS in power control system 206 may be designated as the master inverter PCS, while the other inverter PCSs are designated as slave inverter PCSs. As an example, inverter PCS 206A may be designated as the master and inverter PCS 206B may be designated as a slave. In such embodiments, master inverter PCS 206A may be configured to manage the operation of slave inverter PCS 206B. That way, the operation of more than one inverter PCSs in power control system 206 may not conflict with one another, but instead work together as one cohesive unit to perform a variety of functions.

In embodiments, master inverter PCS 206A may communicate with slave inverter PCS 206B via communication line 212, which may be a wired or wireless line of communication. For example, communication line 212 may be a network cable through which signals may be transmitted (eg: rs-485, rs-232, CAN and the like). Alternatively, communication line 212 may be a wireless fidelity (WiFi) connection, Bluetooth connection, radio frequency (RF) communication, and the like. Communication line 212 may allow master inverter PCS 206A to send commands to slave inverter PCS 206B to control the operation of slave inverter PCS 206B such that its operation does not conflict with, but may instead support, the operation of master inverter PCS 206A. In embodiments, slave inverter 206B does not have the capability to control the operation of master inverter PCS 206A. Instead, slave inverter 206B may only communicate its status of operation to master inverter PCS 206A such that master inverter PCS 206A may better control the operation of power control system 206. Additionally, having only one master inverter PCS 206A provides only one point of contact for controlling power control system 206 through external means, thereby simplifying the means through which power control system 206 is controlled. In other embodiments, energy generation system 200 may not have separate communication line 212. In such embodiments, communication may be performed by power line communication (PLC) in which communication signals may be transmitted through power lines (e.g., power line 209 or 211) that are generally used for transfer of power.

Although FIG. 2 shows energy generation system 200 as having only two inverter PCSs 206A and 206B, embodiments are not limited to such configurations. Other embodiments may have more than two inverter PCSs. As an example, a certain embodiment may have three inverter PCSs, or ten inverter PCSs in another embodiment or more. It is to be appreciated that the number of inverter PCSs may depend on the design requirements of the energy generation system. Higher output power requirements due to larger or a greater number of loads may require a larger number of inverter PCSs. At any rate, regardless of the number of inverter PCSs, one of the inverter PCSs may be a master, and the other inverter PCSs may be slaves that are managed by the master, as discussed herein.

Figure 3:
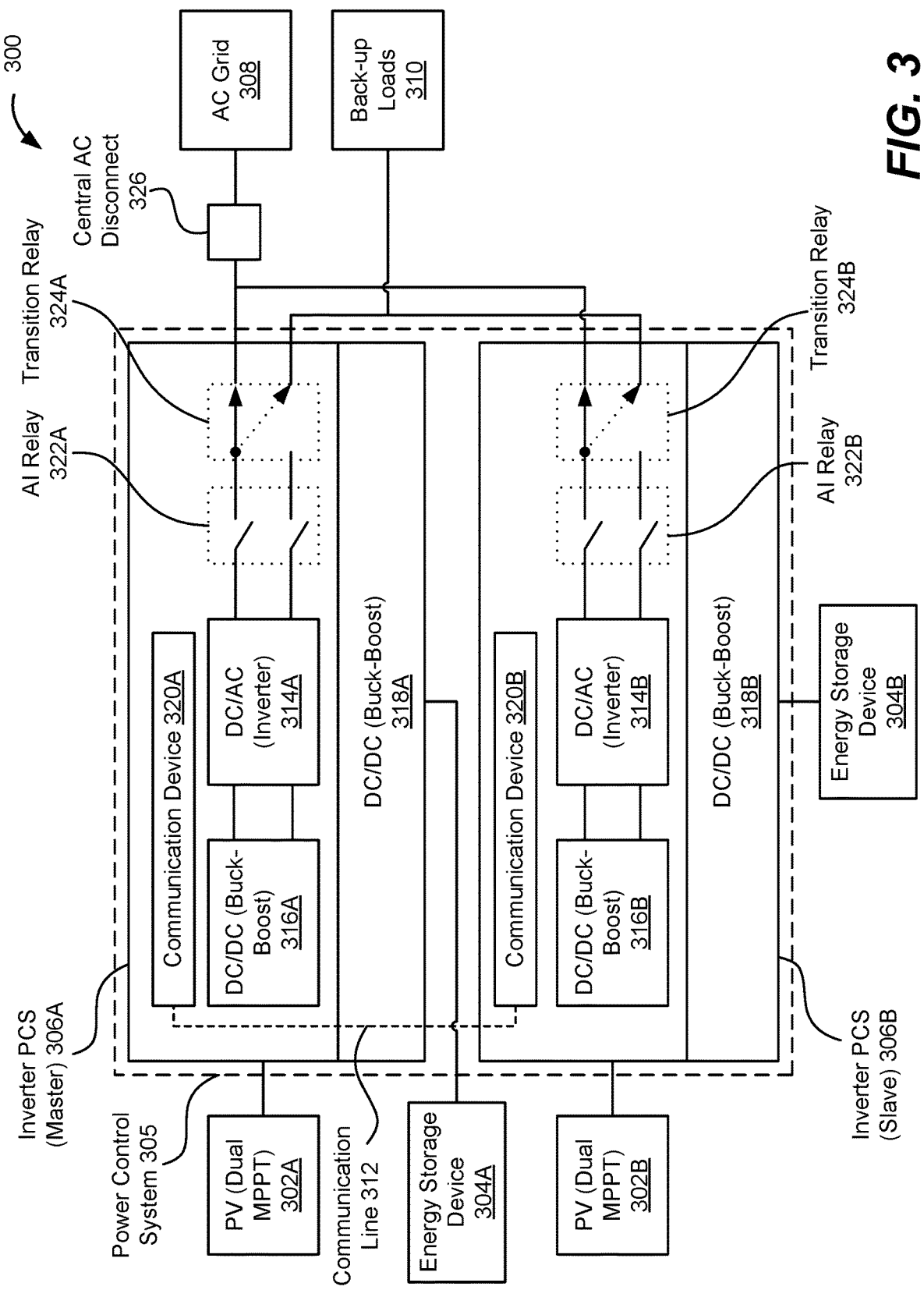
FIG. 3 is a simplified block diagram illustrating details of a power control system for an energy generation system, according to embodiments of the present invention.

In order to better understand the operation of power control system 206, it may be necessary to discuss the internal makeup and configuration of inverter PCSs 206A and 206B, as shown in FIG. 3.

1. Internal Components of an Inverter Power Control System

FIG. 3 illustrates a more detailed block diagram of an exemplary energy generation system 300 showing additional internal components, overall system wiring and inverter wiring compartment interconnections. For ease of discussion, reference to numerical labels without the lettering A or B are directed to the component in general and thus apply to both components, although it is to be understood that components with the same numerical indicator but different alphabetical indicators are separate components.

In embodiments, energy generation system 300 may include power control system 305 that includes more than one inverter PCS 306. Each inverter PCS 306 may be configured to couple to an energy storage device 304 so that the DC power flowing from the PV strings 302 can be used to deliver DC power to energy storage device 304 for storage. Energy storage device 304 has a minimum and maximum associated operating voltage window. The maximum exposed input voltage limit is, in many cases, lower than the theoretical maximum DC voltage outputted by PV strings 302 (open circuit voltage, $V_{OC}$); thus, various embodiments of the invention include a buck-boost circuit 316 between PV strings 302 and energy storage device 304, or between DC/AC inverter 314 and energy storage device 304. The inclusion of buck-boost circuits 316 or 318 may prevent voltages above a safe threshold from being exposed to energy storage device 304, thereby eliminating the possibility of damage to energy storage device 304 from overvoltage stress.

As shown in FIG. 3, each inverter PCS 306 has two DC/DC (Buck-Boost) converters 316 and 318. These converters 316 and 318 represent alternative embodiments. In the first embodiment, the buck-boost circuit is located between PV string 302 and DC/AC inverter 314 (as depicted by DC/DC buck-boost 316) so that the DC input coming from PV strings 302 are always subject to buck or boost, keeping the voltage inputted into DC/AC inverter 314 at a sufficiently high level for inversion while also preventing too high of a voltage from being presented to energy storage device 304. In this embodiment, there is no need for a second buck-boost circuit, e.g., DC/DC buck-boost 318 in inverter PCS 306. In the second embodiment, the buck-boost circuit is located between DC/AC inverter 314 and energy storage device 304 (as depicted by DC/DC buck-boost 318) such that the high voltage DC inputs from PV strings 302 or high voltage rectified DC from AC grid side only go through the buck-boost converter whenever voltage is exposed to energy storage device 304. Either embodiment will prevent energy storage device 304 from being exposed to excessively high voltages generated by PV strings 302. The voltage from the PV strings could be as high as 600 Volts, or even 1000 Volts in the case of a 1 kV PV system in residential applications or 1500 Volts in a utility scale PV system.

DC power may be inputted into a DC/AC inverter stage 314 to convert DC power into AC power. Converted AC power may be outputted to AC grid 308 or back-up loads 310. Outputting to either AC grid 308 or back-up loads 310 is determined by the configuration of one or more relays disposed in each inverter PCS 306. For instance, as shown in FIG. 3, each inverter PCS 306 may include anti-islanding (AI) relays 322 and transition relays 324 for controlling the destination of outputted AC power. AI relay 322 may by a pair of on/off switches that control the flow of power between inverter PCS 306 and AC grid 308. If AI relay 322 is closed, then power may flow from inverter PCS 306 to any of AC grid 308. However, if AI relay 322 is open, then power may not flow to AC grid 308 but connect the transfer relay to output to back-up loads 310. AI relay 322 may be any two-pole or multi-pole (depending on the number of AC phases) single throw switch or functionally equivalent structure that simultaneously opens and closes the power lines in which AI relay 322 is disposed.

In embodiments where AI relay 322 is closed, transition relay 324 may determine whether power is operating in an on-grid mode or an off-grid mode. In the on-grid mode, energy generation system 300 is coupled to AC grid 308 such that power may flow between energy generation system 300 and AC grid 308, whereas in the off-grid mode, energy generation system is disconnected from AC grid 308 and coupled to back-up loads 310 such that power may be provided to back-up loads 310 without assistance from AC grid 308. The position of AI relay 322 and transition relay 324 may dictate which mode of operation energy generation system 300 is in. For instance, in a first position, transition relay 324 will operate in the off-grid mode to allow power to flow from DC/AC inverter stage 314 to on-site back-up loads 310 while DC/AC inverter stage 314 is disconnected from AC grid 308. In a second position, transition relay 324 will operate in the on-grid mode to allow power to flow to/from AC grid 308 while DC/AC inverter stage is disconnected from back-up loads 310. Transition relay 324 may be any suitable mechanical switch or contactor or electrical relay configured to direct power between one input and one or more outputs. In some embodiments, transition relay 324 may be external to the inverter PCS but still be controlled by PCS. In additional embodiments, transition relay 324 may be configured to detect the presence/absence of AC grid 308 and connect the AC output from DC/AC inverter stage 314 to back-up loads 310.

Within the on-grid and off-grid modes, energy generation system 300 may operate in more specific modes. In some modes, power may be flowing exclusively from PV strings 302 to energy storage device 304, while in other modes power may be flowing exclusively from PV strings 302 to AC grid 308 or back-up loads 310. Additionally, in some modes, power may be flowing from energy storage device 304 to AC grid 308 or back-up loads 310, while in other modes, power may be flowing from PV strings 302 to a combination of both energy storage device 304 and AC grid 308 or back-up loads 310.

For example, in a first mode, all available DC power from PV strings 302 may go to respective energy storage device 304 as a priority, with any surplus power being supplied to DC/AC inverter stage 314 of inverter PCS 306 to be supplied to AC grid 308 or delivered to back-up loads 310. In a second mode, all generated power may be supplied to DC/AC inverter stage 314 and either used to power back-up loads 310 or supply power to AC grid 308. In yet other modes, energy storage device 304 may be discharged to DC/AC inverter stage 314 alone and/or with DC power from PV strings 302 to supply AC power to the AC grid 308 or back-up loads 310. Additionally, in a further mode, power may flow from AC grid 308, through DC/AC inverter 314 to charge energy storage device 304, for example, at a time when PV strings 302 are not generating power and demand for power is at its lowest point (e.g., after sunset). In various embodiments, selection of an operating mode may be controlled by logic in inverter PCS 306, or selection could be based on signals from an external source. It is to be appreciated that inverter PCS 306 may route the flow of power between PV strings 302, energy storage device 304, AC grid 308, and back-up loads 310 as desired.

As can be appreciated herein, each inverter PCS may have a vast number of operational modes, which can be complex to operate. Adding additional inverter PCSs in energy generation systems may increase the operational complexity of the energy generation system. Thus, embodiments herein minimize this complexity by designating one inverter PCS as a master, and the rest of the inverter PCSs as slaves. The master inverter PCS may manage the operation of slave inverter PCS such that commands are received and transmitted from one inverter PCS (e.g., the master inverter PCS).

As shown in FIG. 3, inverter PCS 306A is designated as the master inverter PCS, and inverter PCS 306B is designated as the slave inverter PCS. Although FIG. 3 only shows one slave inverter PCS, embodiments having more slave inverter PCSs are also envisioned herein. Master inverter PCS 306A may communicate with slave inverter PCS 306B to enable master inverter PCS 306A to send commands to and receive status information from slave inverter PCS 306B. In embodiments, communication device 320A in master inverter PCS 306A communicates with communication device 320B in slave inverter PCS 306B via communication line 312. Each communication device may be a device suitable for sending and/or receiving communication signals. For instance, each communication device may be an antenna or a communication cable receptacle coupled to a microcontroller, field programmable gate array (FPGA), application specific integrated circuit (ASIC), and the like, configured to interact with the relevant antenna or receptacle.

In embodiments, master inverter PCS 306A may manage the operations of slave inverter PCS 306B. For instance, master inverter PCS 306A may send a command to slave inverter PCS 306B that instructs slave inverter PCS 306B to operate in any of the operating modes mentioned herein. In one example, master inverter PCS 306A may send a command to slave inverter PCS 306B to output AC power to AC grid 308, which results in slave inverter PCS 306B closing its AI relay switch 322B and configuring transition relay 324B to direct AC power to AC grid 308. Accordingly, master inverter PCS 306A may instantaneously control when relays 322 and 324 in slave inverter PCS 306B change positions. This instantaneous control allows master inverter PCS 306A to operate both inverter PCSs (master and slave) simultaneously such that the power control system operates as a single unit. For instance, master inverter PCS 306A and slave inverter PCS 306B may simultaneously transition their relays 322 and 324 to output power to AC grid 308. Sometime thereafter, master inverter PCS 306A and slave inverter PCS 306B may then simultaneously transition their relays 322 and 324 to operate in a different mode, e.g., output AC power to back-up loads 310. In some embodiments, AC output from both inverter PCSs (master and slave) may be turned off, e.g., transitioning AI relays 322A and 322B into the open position, during service/maintenance for personnel safety.

It is to be appreciated that master inverter PCS 306A may manage the operation of slave inverter PCS 306B, but this control is not mutual, meaning slave inverter PCS 306B cannot send a command to master inverter PCS 306A to manage the operation of master inverter PCS 306A. By having only one master inverter PCS 306A, and one or more slave inverter PCS 306B, the communication routes are minimized and the operational complexity is minimized. Commands may originate from one inverter PCS; thus, there is minimal chance that conflicting commands will be sent in the energy generation system.

The operation of master inverter PCS 306A may be controlled externally and dynamically, such as by a technician or a customer. In some embodiments, the position of the transition relay may be controlled by the master inverter PCS 306A in accordance with an algorithm or predetermined program.

As mentioned above, energy generation system 300 may transition between off-grid and on-grid modes. It is to be appreciated that if the transition from off-grid to on-grid operation is not performed properly, a sudden influx of AC power from the AC grid or huge power draw from many back-up loads may damage one or more inverter PCSs. For instance, in conventional energy generation systems, inverters may detect when to transition from off-grid to on-grid mode. The inverters may each be separately configured to detect when AC power begins to be provided by the AC grid. Upon detection of the presence of the AC grid, each inverter may transition from off-grid mode to on-grid mode. The problem with this is that due to differences in measurement and timing accuracy during synchronization, each inverter may transition to on-grid mode at a different instance in time. This may cause damage to the first inverter to switch to on-grid mode because the first inverter to switch to on-grid mode will receive the entire AC power from the AC grid or huge power draw from many back-up loads (when all inverter PCS are backing-up all loads combined). Such a large influx of power may be too much for one inverter to bear, thereby causing damage to the inverter internal components and resulting in malfunction of the energy generation system.

To prevent this from occurring, embodiments herein incorporate a central AC disconnect 326 positioned along an AC power bus between AC grid 308 and inverter PCSs 306A and 306B. Central AC disconnect 326 may stall the influx of power until all inverter PCSs have been transitioned to on-grid mode to avoid the occurrence of one inverter PCS from bearing the entire influx of power from AC grid 308 or from back-up loads 310 during off-grid mode. The details of this operation will be discussed further herein.

2. Central AC Disconnect

In embodiments, a central AC disconnect may be positioned along an AC bus between inverter PCSs and an AC grid. The central AC disconnect may be configured to open and close the AC bus to control power flow from AC grid 308 such that damage to inverter PCS caused by an influx of AC power from the AC grid may be prevented.

Figure 4:
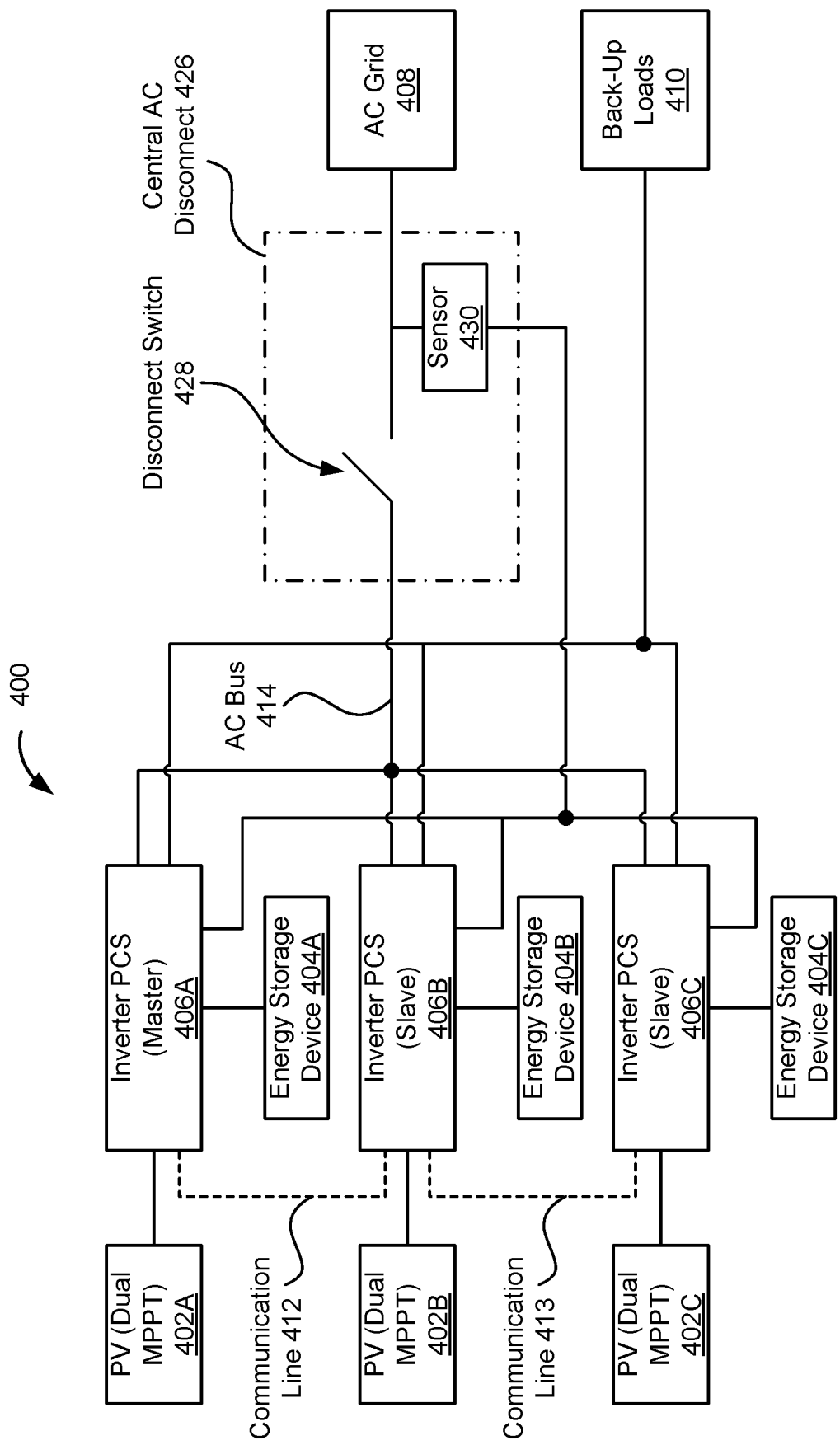
FIG. 4 is a simplified block diagram illustrating details of a central AC disconnect for an energy generation system, according to embodiments of the present invention.

FIG. 4 shows an exemplary energy generation system 400 having PV strings 402A-402C, energy storage devices 404A-404C, inverter PCSs 406A-406C, and a central AC disconnect 426, according to embodiments of the present invention. Inverter PCS 406A is the master, and inverter PCSs 406B and 406C are the slaves. Energy generation system 400 is configured to provide AC power to AC grid 408 and back-up loads 410. As shown in FIG. 4, energy generation system 400 includes three PV strings 402A-402C coupled to three inverter PCSs 406A-406C independently. Details of components within each inverter PCS discussed herein with respect to FIG. 3 are not shown in FIG. 4 for ease of discussion.

Outputs of inverter PCSs 406A-406C may combine into an AC bus 414 before outputting to AC grid 408. Central AC disconnect 426 may be positioned along AC bus 414 to control power flow between inverter PCSs 406A-406C and AC grid 408. In embodiments, central AC disconnect 426 may include disconnect switch 428 that is configured to open AC bus 414 to prevent current flow. Disconnect switch 428 may be electrically controlled such that a signal may control whether disconnect switch 428 is activated (i.e., in the closed position) or not activated (i.e., in the open position). In certain embodiments, disconnect switch 428 is controllable by master inverter PCS 406A, meaning master inverter PCS 406A may dictate when disconnect switch 428 is activated. In certain embodiments, disconnect switch 428 is a mechanical switch or contactor or electrical relays.

As shown in FIG. 4, with central AC disconnect switch 428 is in the open position, thus preventing power flow between inverter PCSs 406A-406C and AC grid 408. In such embodiments, energy generation system 400 may be off-grid, i.e., operating independently from AC grid 408. During off-grid operation, AC grid 408 may not be providing power to energy generation system 400. For instance, AC grid 408 may be offline as a result of a black out. When AC grid 408 is back online, disconnect switch 428 may close and energy generation system 400 may transition from off-grid to on-grid operation. When energy generation system 400 transitions from off-grid to on-grid operation, disconnect switch 428 may be activated and power may flow from AC grid 408 to inverter PCSs 406A-406B.

To ensure proper transition from off-grid to on-grid operation, central AC disconnect 426 may include a sensor 430 configured to monitor AC bus 414 for determining when AC power is being provided by AC grid 408. Sensor 430 may be communicatively coupled to master inverter PCS or all inverter PCSs, e.g., inverter PCS 406A-406C, such that inverter PCSs 406A-406C can monitor signals from sensor 430 to determine when AC power is being provided by AC grid 408. In embodiments, sensor 430 may be a voltage or current meter that can detect the presence of AC power in AC bus 414. Incorporating central AC disconnect 426 according to embodiments herein may eliminate the possibility of overloading one inverter PCS when AC power from AC grid 408 becomes available, as discussed further in FIGS. 5A and 5B.

Figure 5A:
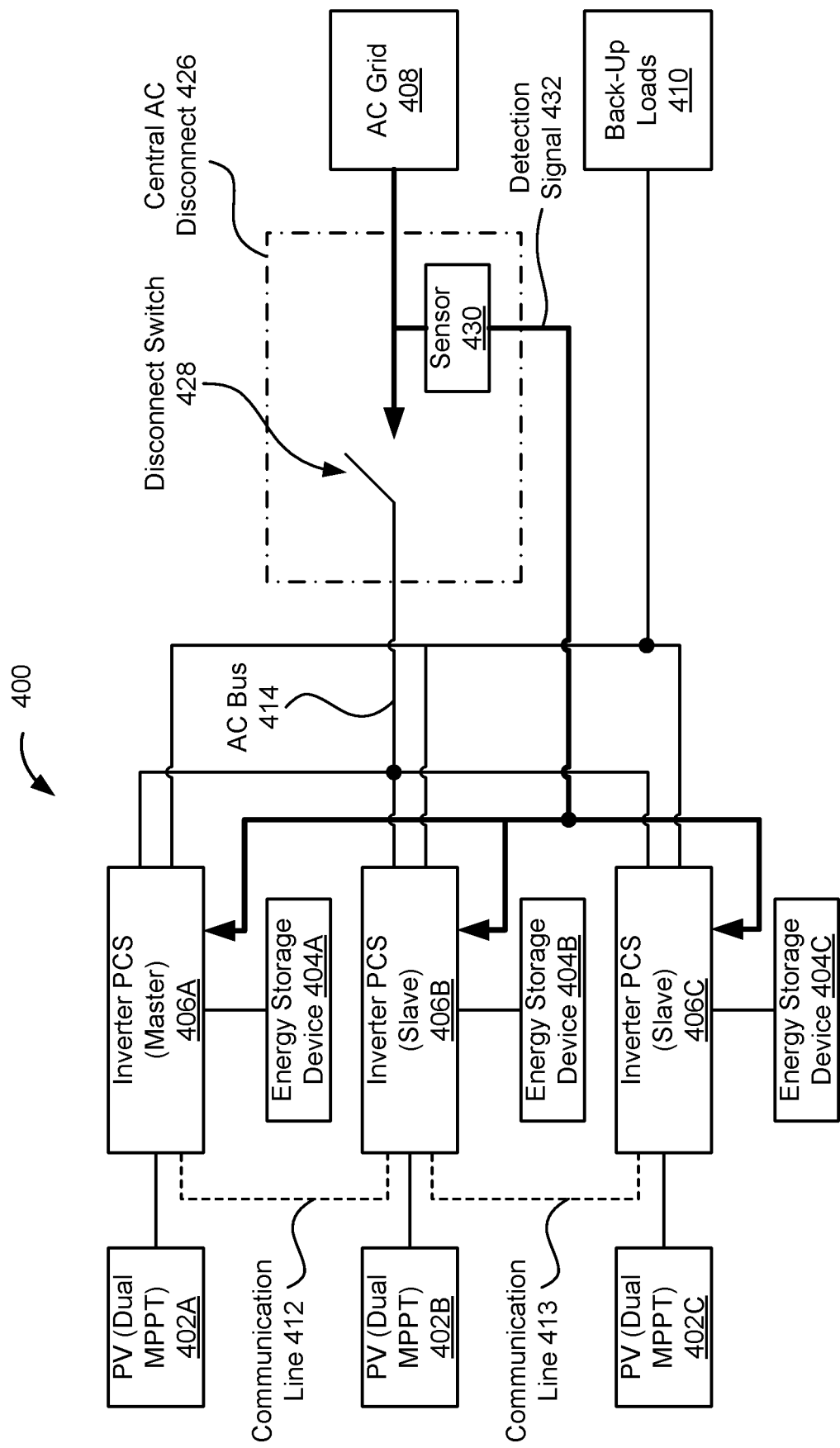
FIGS. 5A and 5B are simplified block diagrams illustrating a method of operating a central AC disconnect to prevent damage to an energy generation system, according to embodiments of the present invention.
Figure 5B:
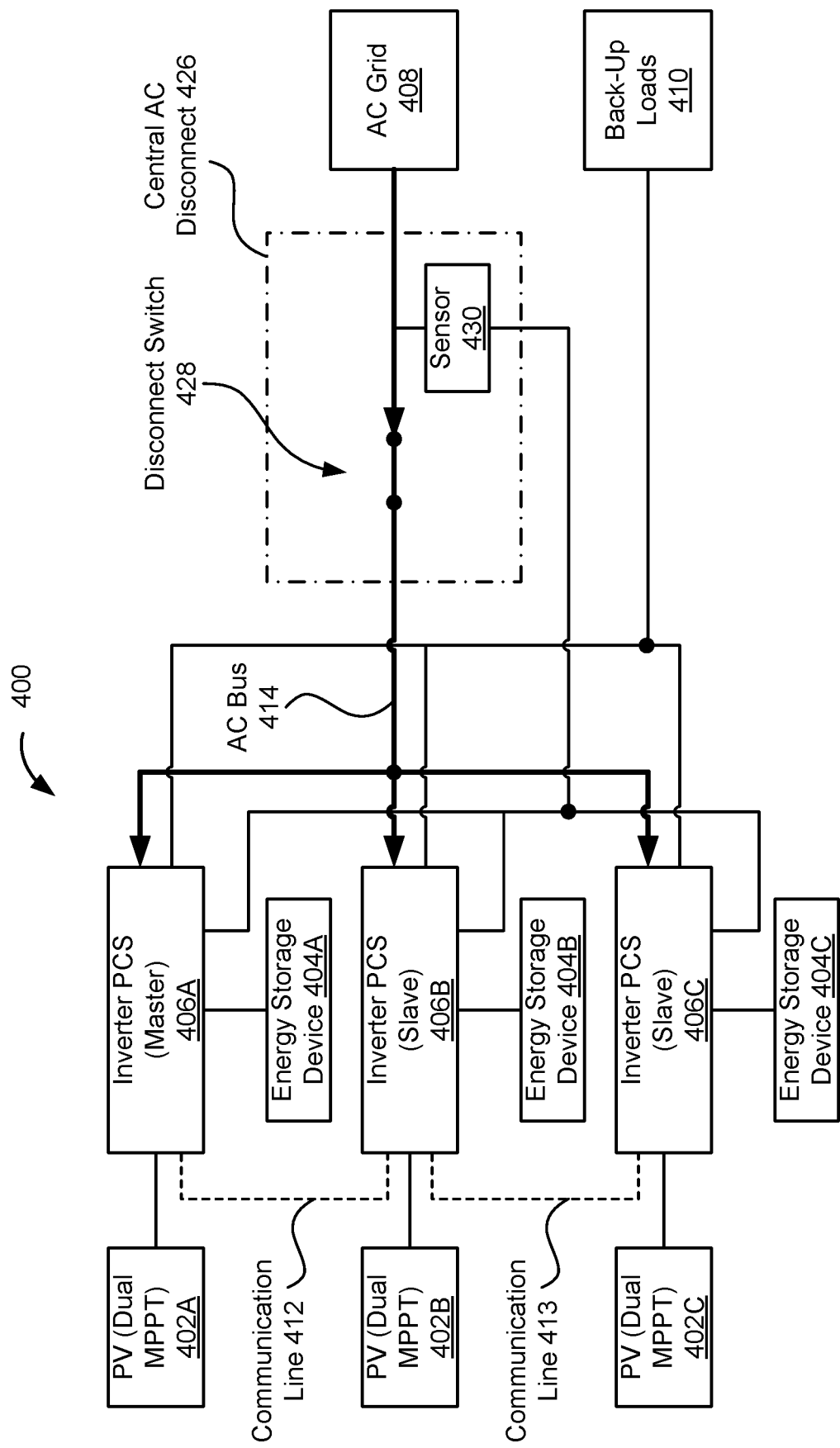

FIGS. 5A and 5B illustrate the operation of energy generation system 400 during the transition from off-grid to on-grid mode. The bolded arrows indicate active power and/or communication lines operating around the time of transition between off-grid to on-grid operation. As shown in FIG. 5A, when power from AC grid 408 is available, sensor 430 may detect AC power in a part of AC bus 414 between disconnect switch 428 and AC grid 408. Sensor 430 may then send detection signal 432 to inverter PCSs 406A-406B indicating that AC power is now available, which then causes inverter PCSs 406A-406C to switch to on-grid mode, e.g., transition relays 324 are switched in a position to receive power from AC grid 308 as discussed herein with respect to FIG. 3. Once all inverter PCSs have transitioned to on-grid mode, then central AC disconnect 426 may close disconnect switch 428 as illustrated in FIG. 5B. With disconnect switch 428 closed, AC power may simultaneously flow through inverter PCSs 406A-406C. Enabling inverter PCSs 406A-406C to transition to on-grid mode before disconnect switch 428 is closed prevents the situation where one inverter PCS bears the entire AC power from AC grid 408. Accordingly, damage to an inverter PCS caused by an overload of incoming AC power may be avoided.

In embodiments, each inverter PCS 406A-406C may receive detection signal 432 from sensor 430 to determine when to switch to on-grid mode. In other embodiments, only master inverter PCS 406A may receive detection signal 432. In such embodiments, master inverter PCS 406A may, upon detecting availability of AC power from detection signal 432, send commands to slave inverter PCSs 406B and 406C via communication lines 412 and 413 to cause slave inverter PCSs 406B and 406C to transition to on-grid mode.

B. Charging Operation by Master Inverter PCS

Figure 6:
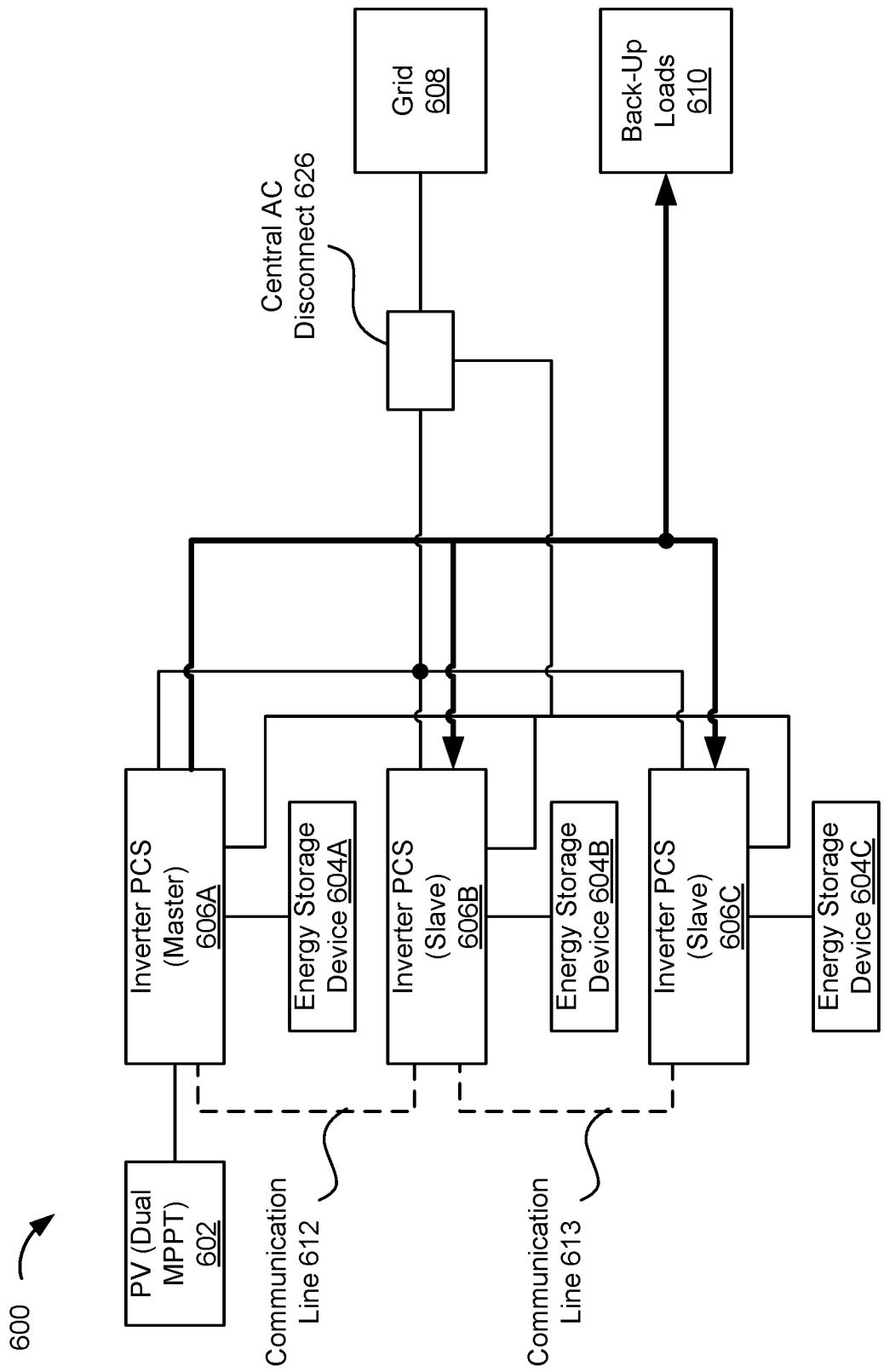
FIG. 6 is a simplified block diagram illustrating a master inverter PCS configured to store energy in energy storage devices coupled to itself and slave inverter PCSs, according to embodiments of the present invention.

According to embodiments, designating one inverter PCS as a master and the other inverter PCSs as slaves enables operations of energy generation systems that would otherwise be substantially more complicated to perform without the designation of master and slave inverter PCSs. This may be particularly true for situations where an energy generation system has multiple inverters and multiple energy storage devices, but only one inverter is coupled to an array of PV strings, as shown in FIG. 6. In some embodiments, more than one inverter could be coupled to an array of PV strings but not necessary all inverters.

FIG. 6 illustrates an exemplary energy generation system 600 including one array of PV strings 602, master inverter PCS 606A, slave inverters 660B and 606C, and energy storage devices 604A-604C. Each inverter PCS may output to either an AC grid 608 or back-up loads 610. As shown in FIG. 6, PV strings 602 may output DC power to only master inverter PCS 606A. This energy generation system configuration may be a result of cost or spatial constraints and power requirements established by a customer of energy generation system 600. Having only one array of PV strings saves cost as more arrays of PV strings increases cost. Additionally, having more inverters PCSs allows energy generation system 600 to provide more power to drive back-up loads 610, such as for a large commercial building or a large residential building. Furthermore, having more energy storage devices allows energy generation system 600 to store more power so that energy generation system 600 can provide power to drive back-up loads 610 for a longer period of time as extended energy capacity when daylight or AC power from AC grid 608 is unavailable.

As can be appreciated by one skilled in the art, operating energy generation system 600 may be complex. There is only one source of DC power, yet there are multiple inverters, energy storage devices, and output destinations. Configuring the power control system to operate as one cohesive unit to store DC power in the energy storage devices and also output AC power to AC grid 608 or back-up loads 610 with conventional inverters that do not have master of slave designations can be extremely complicated. However, according to embodiments herein, this operation can be simplified by having one inverter control the operation of all inverters to manage the flow of power between PV strings 602 and AC grid 608 or back-up loads 610.

For instance, master inverter PCS 606A may control the operation of slave inverter PCSs 606B and 660C. In one embodiment, master inverter PCS 606A may receive DC power from PV strings 602 and evenly distribute the DC power to energy storage devices 604A-604C by commanding slave inverter PCSs 606B and 606C to store the DC power received from master inverter PCS 606A into respective energy storage devices 604B and 604C. In another embodiment, as shown by the bolded arrows in FIG. 6, master inverter PCS 606A may be capable of outputting AC power to back-up loads 610 while also storing surplus DC power to energy storage devices 604B and 604C of slave inverter PCSs 606B and 606C, respectively, via AC coupling. In this embodiment, master inverter PCS 606A may direct some AC power to drive back-up loads 610 while directing some DC power to slave inverter PCSs 606B and 606C for storage in energy storage devices 604B and 604C. Master inverter PCS 606A may send commands to slave inverter PCSs 606B and 606C through communication lines 612 and 613 that instruct slave inverter PCSs 606B and 606C to store the received DC power into energy storage devices 604B and 604C. In other embodiments, any one of slave inverter PCSs 606B or 606C may output AC power converted from its respective energy storage device 604B or 604C while other inverter PCSs store DC power. It is to be understood that any combination of outputting AC power and storing DC power may be performed under the command of master inverter PCS without departing from the spirit and scope of the present invention.

As can be appreciated herein, the operation of energy generation system 600 is greatly simplified by having one inverter PCS act as the manager of power flow between PV strings 602 and AC grid 608/back-up loads 610. By implementing master and slave inverter PCSs, only one device is in charge of operating the functions of energy generation system 600. Having only one device be in charge of the operations substantially simplifies the operation of energy generation system 600 while also maximizing the efficiency and functionality of the energy generation system.

II. Energy Generation System Configured for Elongated Power Utilization

In addition to an energy generation system configured to have a plurality of inverter PCSs to output a greater magnitude of AC power, embodiments may also include an energy generation system configured to have a plurality of energy storage devices coupled to a single inverter PCS for providing usable energy for an elongated period of time and/or greater magnitude of AC power. For example, according to embodiments, an energy generation system may include at least two energy storage devices coupled to an inverter PCS. DC power generated by an energy generation device, such as an array of PV modules, may be stored in the energy storage devices. The stored energy may be discharged at a later time and converted into AC power by the inverter PCS. The converted AC power may then be outputted to an AC grid or back-up loads. According to embodiments, the inverter PCS may be communicatively coupled to each energy storage device for operating the energy storage devices. Alternatively, one of the energy storage devices may be designated as a master, while other energy storage devices may be designated as slaves. The master inverter PCS may mange the operation of slave energy storage devices. Embodiments herein increase the duration of time in which the energy generation system may provide power to AC grid or back-up loads. Increasing the duration of time may be particularly useful in situations where the installation site does not have reliable access to a utility grid, or where sunlight is not consistent or plentiful or where more energy storage is required for load shifting application.

Figure 7:
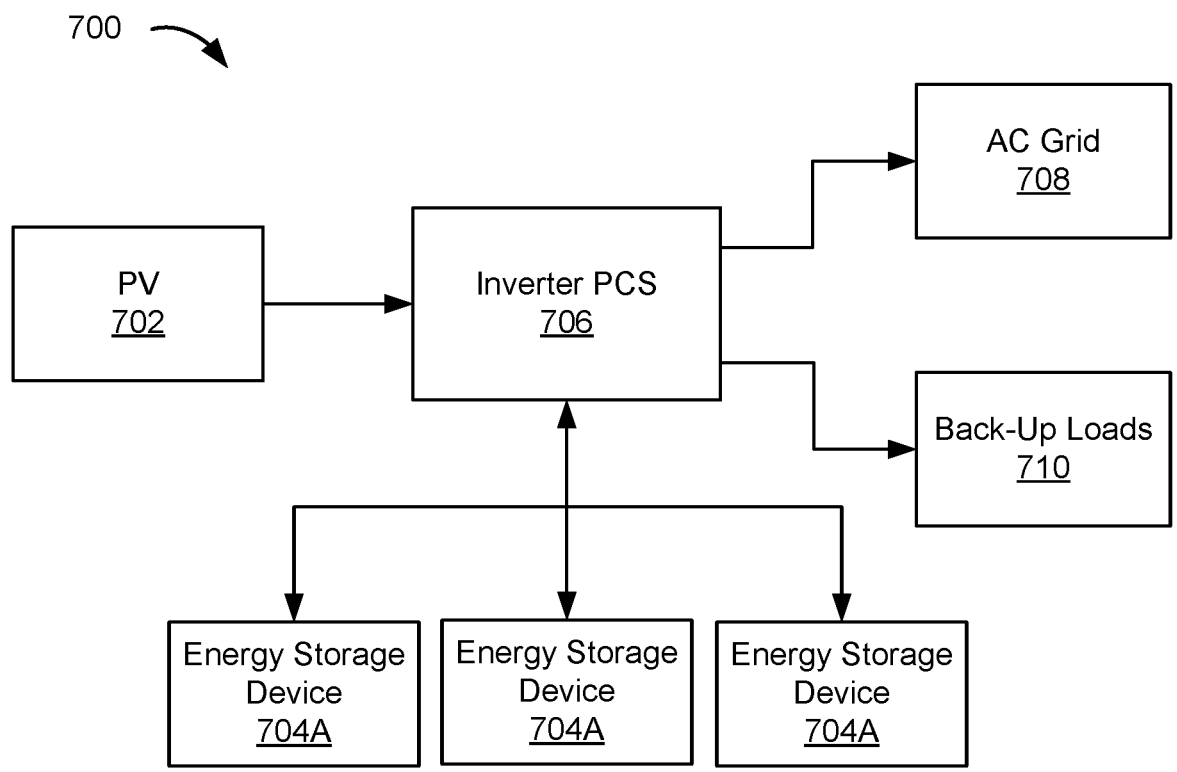
FIG. 7 is a simplified block diagram illustrating an energy generation system including one inverter PCS and a plurality of energy storage devices, according to embodiments of the present invention.

FIG. 7 illustrates an exemplary energy generation system 700 having a plurality of energy storage devices (e.g., energy storage devices 704A-704C). Each of the energy storage devices 704A-704C may be coupled to inverter PCS 706 such that inverter PCS 706 may draw DC power from, and store DC power in, energy storage devices 704A-704C. Larger numbers of energy storage devices increases the complexity and logistics of managing power flow across the energy generation system. Inefficient power flow management may result in under-utilization of the energy generation system and decreased performance, ultimately resulting in monetary losses to the customer.

According to embodiments of the present invention, the plurality of energy storage devices may be part of an energy storage system. The energy storage system may include a battery combiner box in addition to the plurality of energy storage devices. The battery combiner box may combine DC power being charged/discharged from the energy storage devices to an inverter PCS interface. The battery combiner box may also distribute generated DC power to the plurality of energy storage devices for storage. According to embodiments, one energy storage device may be designated as a master energy storage device and configured to manage the operations of the other energy storage devices. The energy storage system will be discussed in detail further herein with respect to FIG. 8.

A. Energy Storage System

Figure 8A:
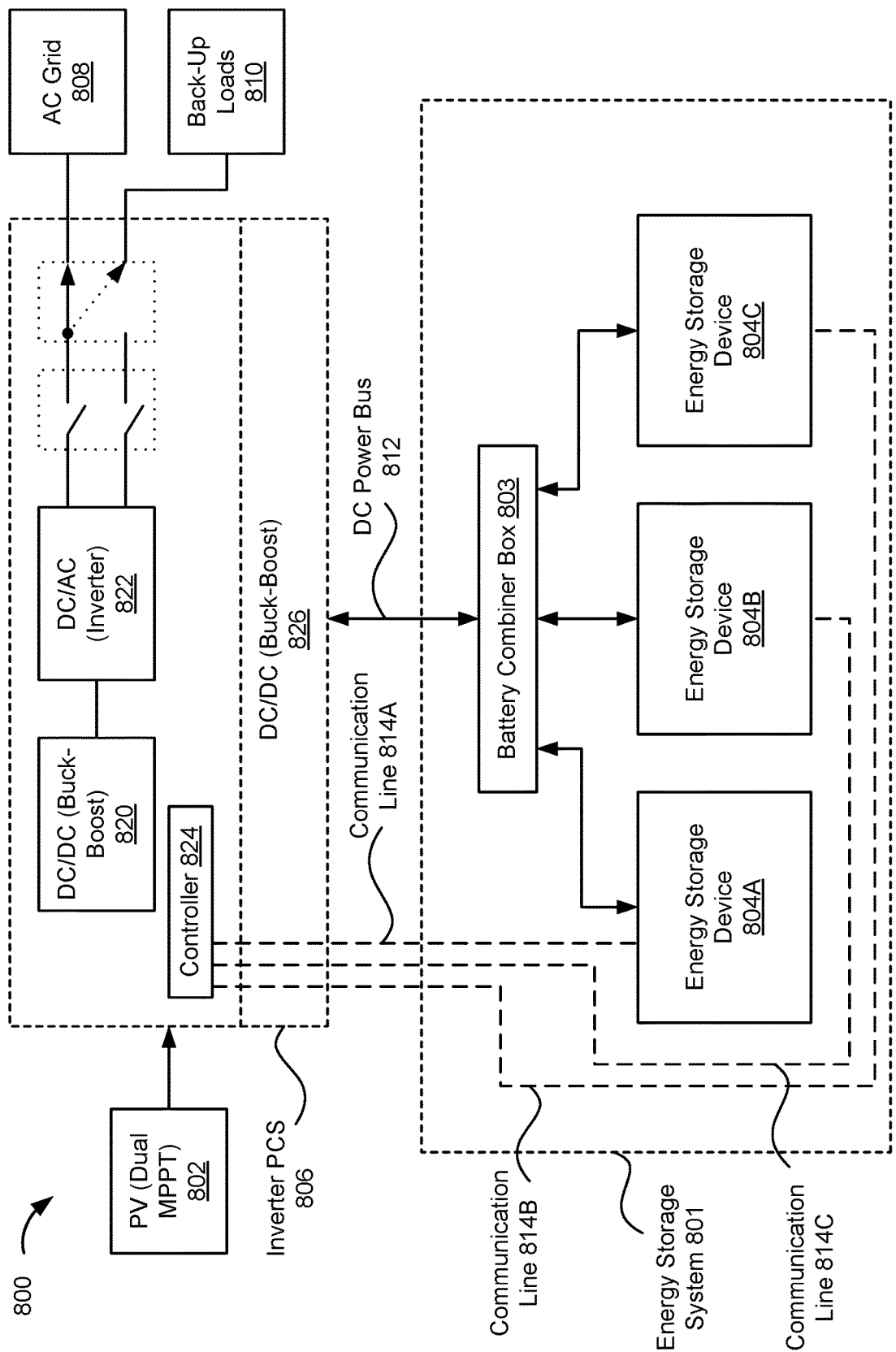
FIG. 8A is a simplified block diagram illustrating details of an energy generation system where an inverter PCS is communicatively coupled to each energy storage device in a parallel (independent) configuration, according to an embodiment of the present invention.

FIG. 8A illustrates an exemplary energy generation system 800 having an energy storage system 801 according to embodiments of the present invention. As shown, an array of PV strings 802 is coupled to input of an inverter PCS 806. Similar to inverter PCS 306A and 306B in FIG. 3, inverter PCS 806 may include DC/DC buck-boost converter 820 (or DC/DC buck-boost converter 826 in the alternative) and DC/AC inverter stage 822. The operations of buck-boost converters 820 and 826 and DC/AC inverter stage 822 are substantially similar to the corresponding components in inverter PCS 306A and 306B in FIG. 3.

Also, similar to array of PV strings 302A and 302B, array of PV strings 802 may include a plurality of PV modules (not shown) connected serially with an additive direct current (DC) voltage somewhere between 100 and 1000 volts or even higher, depending on such factors as the number of panels, their efficiency, their output rating, ambient temperature and irradiation on each panel. PV strings 802 may also include a maximum power-point tracking (MPPT) system for maximizing the power output of each array of PV strings. In some embodiments, the MPPT system may be a dual MPPT PV system as shown in FIGS. 2 and 3.

Energy generation system 800 may only have a single inverter PCS 806. Thus, the magnitude of power capable of being output by inverter PCS 806 may not be as high as what may be achievable by a parallel-coupled plurality of inverter PCSs (such as the embodiment discussed in FIGS. 2 and 3). However, energy generation system 800 may output the lower magnitude of power for a longer period of time due to the large energy storage capacity from more than one energy storage device. In some embodiments, the battery combiner box, DC/DC buck-boost 826, and DC/AC inverter 822 may support more power (aggregated outputs of all the energy storage devices).

According to embodiments of the present invention, energy storage system 801 may include a plurality of energy storage devices 804A-804C configured to charge and discharge DC power. Having plurality of energy storage devices 804A-804C in energy generation system 800 allows energy generation system 800 to provide AC power to AC grid or back-up loads 810 for an elongated period of time. This may be especially useful in situations where the energy generation system 800 is installed at a location that does not have access to a utility grid or at a location that does not receive much sunlight (e.g., a home in a remote location without access to a utility grid, or a home in a tropical region with lots of clouds and rain). This may also be useful in situations where energy generation system 800 is installed at a location that does not consume a lot of power, such as a small building (e.g., a single family home, a hut, or a small commercial building).

In embodiments, energy storage system 801 may include a battery combiner box 803 coupled to energy storage devices 804A-804C. Battery combiner box 803 may route power between inverter PCS 806 and energy storage devices 804A-804C. For instance, battery combiner box 803 may receive discharged power from energy storage devices 804A-804C and combine them together into DC power bus 812 as a single DC output to inverter PCS 806, or battery combiner box 803 may store power from DC power bus 812 to energy storage devices 804A-804C.

Having a plurality of energy storage devices may result in a more complex energy generation system. It may be necessary to coordinate the power flow into and out of the plurality of energy storage devices in a way that maximizes the functionality and versatility of the energy generation system. Thus, according to embodiments of the present invention, controller 824 may be coupled to energy devices 804A-804C via communication lines 814A-814C, respectively. Controller 824 may be a device configured to manage the operation of energy storage devices 804A-804C, such as an FPGA, microprocessor, ASIC, and the like. As shown in FIG. 8A, controller 824 may directly communicate with each energy storage device 804A-804C in a parallel configuration, which allows controller 824 to send unique commands to each energy storage device with little to no time delay. Accordingly, controller 824 may orchestrate the operation of energy storage devices 804A-804C such that they work together as one cohesive unit to perform a variety of functions, as will be discussed further herein with respect to FIG. 12.

In embodiments, communication lines 814A-814C may be wired or wireless types of communication. For example, communication lines 814A-814C may be network cables through which signals may be transmitted (rs-485, rs-232, CAN and the like). Alternatively, communication lines 814A-814C may be wireless fidelity (Wi-Fi) connections, Bluetooth connections, radio frequency (RF) connections, and the like. As shown in FIG. 8, communication lines 814A-814C are wireless communication lines. In other embodiments, energy generation system 800 may not have communication lines 814A-814C. In such embodiments, communication may be performed by power line communication (PLC) in which communication signals may be transmitted through power lines that are generally used for transfer of power.

Controller 824 is shown to be communicatively coupled to energy storage devices 804A-804C in an parallel configuration, meaning that separate communication lines 814A-814C may allow controller 824 to directly communicate with each energy storage device 804A-804C. However, embodiments are not limited to such configurations. Other configurations may have a daisy-chained (i.e., serial) communication connection between controller 824 and energy storage devices 804A-804C, as shown in FIG. 8B.

Figure 8B:
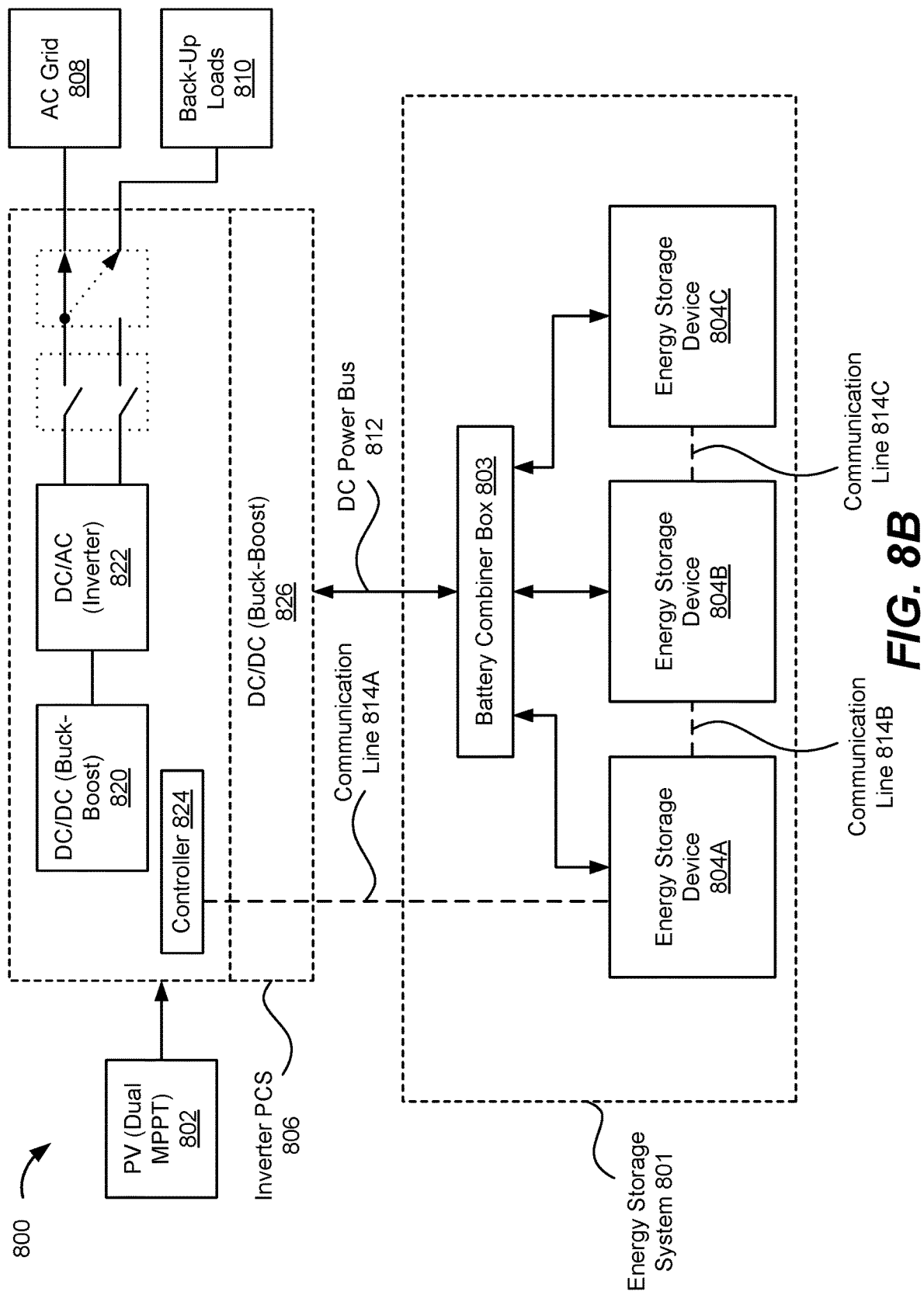
FIG. 8B is a simplified block diagram illustrating details of an energy generation system where an inverter PCS is communicatively coupled to each energy storage device in a serial (i.e., daisy-chain) configuration, according to an embodiment of the present invention.

FIG. 8B is a simplified diagram illustrating energy generation system 800 where controller 824 is communicatively coupled to energy storage devices 804A-804C in a daisy-chained or serial configuration. In such configurations, controller 824 may indirectly communicate with one or more energy storage devices 804A-804C. That is, controller 824 may have to rely on intermediary energy devices for sending commands to energy storage devices 804A-804C. As an example, in order for controller 824 to send a command to energy storage device 804C, controller 824 may first send the command to energy storage device 824A, which then relays the information to energy storage device 804B, which then finally gets relayed to energy storage device 804C. It is to be appreciated that any configuration may be utilized for establishing communication between controller 824 and energy storage devices 804A-804C without departing from the spirit and scope of the present invention.

Although FIGS. 8A and 8B illustrate energy generation system 800 as having only three energy storage devices 804A-804C, embodiments are not limited to such configurations. Other embodiments may have more than three energy storage devices. As an example, a certain embodiment may have four energy storage devices, ten energy storage devices in another embodiment, or even more in other embodiments. It is to be appreciated that the number of energy storage devices may depend on the design requirements of the energy generation system. Larger storage capacity requirements due to longer periods of no sunlight may require a larger number of energy storage devices.

Figure 9:
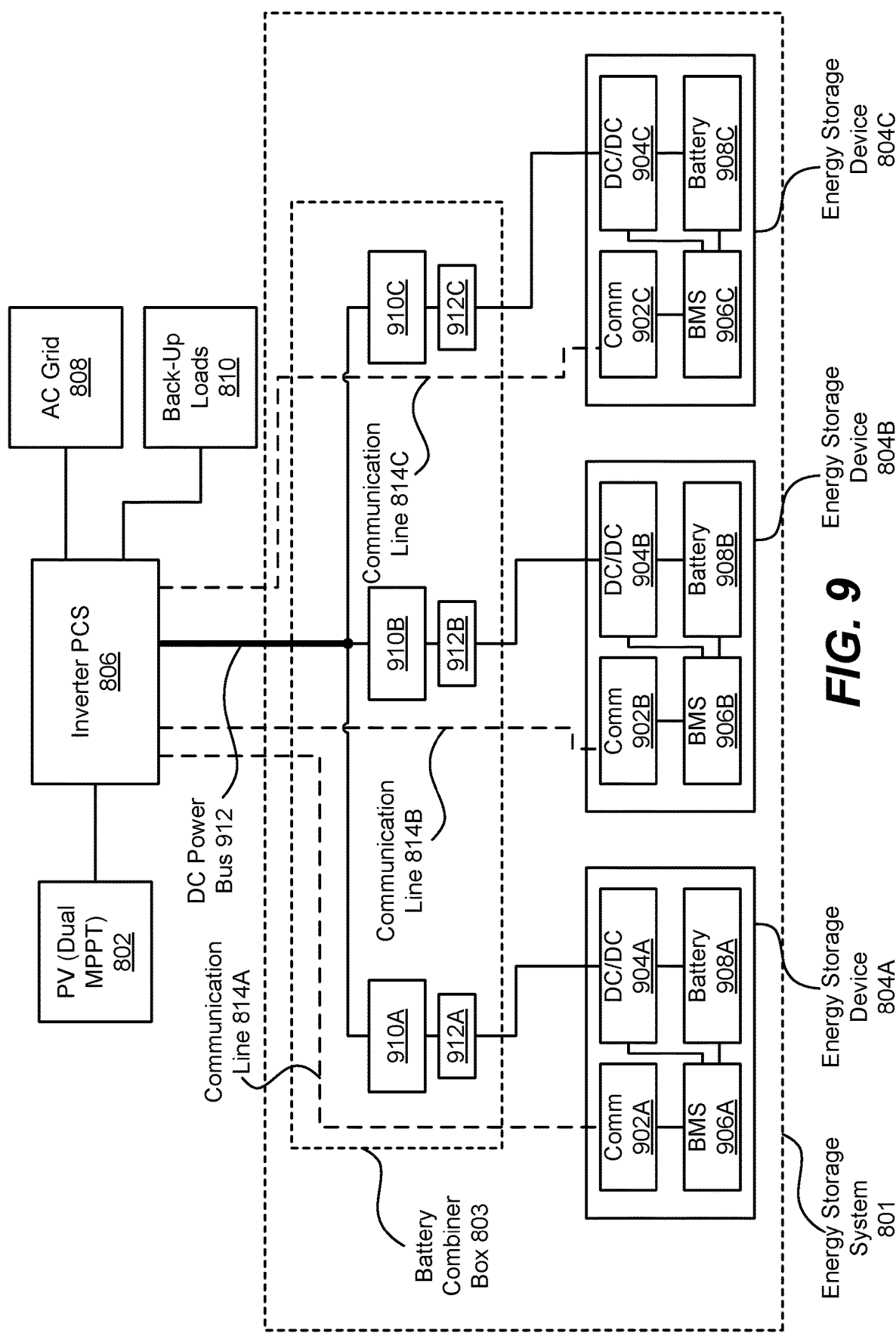
FIG. 9 is a simplified block diagram illustrating details of energy storage devices and a battery combiner box for an energy generation system where the battery combiner box has protection components, according to an embodiment of the present invention.

In order to better understand the operation of energy generation system 800, it may be necessary to discuss the internal makeup and configuration of battery combiner box 803 and energy storage devices 804A-804C in energy storage system 801, as shown in FIG. 9.

B. Components of an Energy Storage System

FIG. 9 is a simplified diagram illustrating the internal components of a battery combiner box 803 and energy storage devices 804A-804C shown in FIGS. 8A and 8B herein, according to an embodiment of the present invention. For ease of discussion, reference to numerical labels without the lettering A, B, or C are directed to the component in general and thus apply to all duplicative components, although it is to be understood that components with the same numerical indicator but different alphabetical indicators are physically separate components.

As shown, energy storage devices 804A-804C may each include an energy storage component, such as battery 908, fuel cell, or the like, as well as other components aside from mere energy storage that enable energy storage devices 804A-804C to perform additional functions. As an example, energy storage devices 804A-804C may each include a communication component 902, DC/DC converter 904 and a battery management system (BMS) 906, with all of them interconnected, according to embodiments of the present invention.

Communication component 902 may be a component for establishing communication with controller 824 of inverter PCS 806, as shown in FIG. 8. For instance, communication component 902 may be an FPGA, microprocessor, ASIC, and the like, configured to establish a wireless (e.g., WiFi, Bluetooth, or RF) communication with controller 824. BMS 906 may be a component that manages the operation of battery 908. In embodiments, BMS 906 may prevent battery 908 from operating outside of its operating limits, such as preventing battery 908 from being overcharged or monitoring the state of the battery, or any other related functions (charging, discharging, fault protection and the like).

DC/DC converter 904 may be a boost converter, buck converter, or a buck-boost converter configured to alter the output voltage of battery 908. DC/DC converter 904 may be configured to standardize the output DC voltage of battery 908 such that a standard amount of power may be provided by energy storage device 804 regardless of the specification of battery 908. Implementing DC/DC converter 904 is important because it allows flexibility in the type of battery utilized by energy storage system 801. Different manufacturers may produce batteries that output different magnitudes of DC voltages. By incorporating DC/DC converter 904 in the energy storage device, the output DC voltage outputted by energy storage devices 804 may be standardized across all energy storage devices 804.

In embodiments, batteries 908 and DC/DC converters 904 may include protection circuits (not shown) configured to protect batteries 908 and DC/DC converters 904 from operational harm (e.g., harm caused by over voltages, reverse polarity, over currents, ground faults, surges and the like). As an example, batteries 908 may include protection circuits for preventing batteries 908 from short-circuiting when coupled to DC/DC converters 904. DC/DC converters 904 may include protection circuits for preventing damage to energy storage devices 804 when an energy storage device is connected in series with other energy storage devices.

The output DC voltage of each energy storage device 804 may be routed through battery combiner box 803 before being inputted into inverter PCS 806. In embodiments, battery combiner box 803 may include one or more disconnection and protection components 910 configured to sever a transmission of power between an energy storage device and inverter PCS 806. For instance, disconnection and protection components 910 may be a switch, contactor, fuse, relay, circuit breaker, and the like. Disconnection and protection components 910 may protect energy storage devices 804 from short circuiting, drawing too much current during operation of energy generation system 800, or from being connected in the wrong orientation. In embodiments, disconnection and protection components 910 are disposed along a power line for routing power between energy storage devices 804 and inverter PCS 806.

In addition to disconnection and protection components 910, battery combiner box 803 may also include one or more visual indicators 912. In embodiments, visual indicators 912 may be configured to visually indicate whether power, voltage, or current is flowing through a power line. For example, visual indicators 912 may be light emitting diodes (LEDs) that emit light when power is flowing through a power line along which the visual indicator is disposed, and that do not emit light when power is not flowing through the power lines. Visual indicators 912 may be formed of any other suitable component that does not depart from the spirit and scope of the present invention. In some embodiments, additional visual indicators (not shown) may be disposed in each energy storage device 804 for indicating whether energy storage device 804 is operational.

Although FIG. 8 illustrates battery combiner box 803 as having three disconnection and protection components 910A-910C and three visual indicators 912A-912C, it is to be appreciated that embodiments are not limited to such configurations. The number of disconnection and protection components 910 and visual indicators 912 may be dependent on the number of energy storage devices 804. Thus, the number of disconnection and protection components 910 and visual indicators 912 may be determined according to system design.

DC power outputted by energy storage devices 804 may be combined in battery combiner box 803 into DC power bus 912 and then outputted to inverter PCS 806. Thus, power flowing through DC power bus 912 may be a sum of the individual outputted power from energy storage devices 804A-804C.

According to embodiments, the amount of power outputted to DC power bus 912 may be determined based upon commands sent from inverter PCS 806. That is, inverter PCS 806 may manage energy storage devices 804 to output DC power by sending commands through communication lines 814A-814C. Being capable of communicating with energy storage devices 804A-804C enables several different charging/discharging schemes for energy storage devices 804A-804C, as shown in FIG. 10.

C. Operating an Energy Storage System

Figure 10:
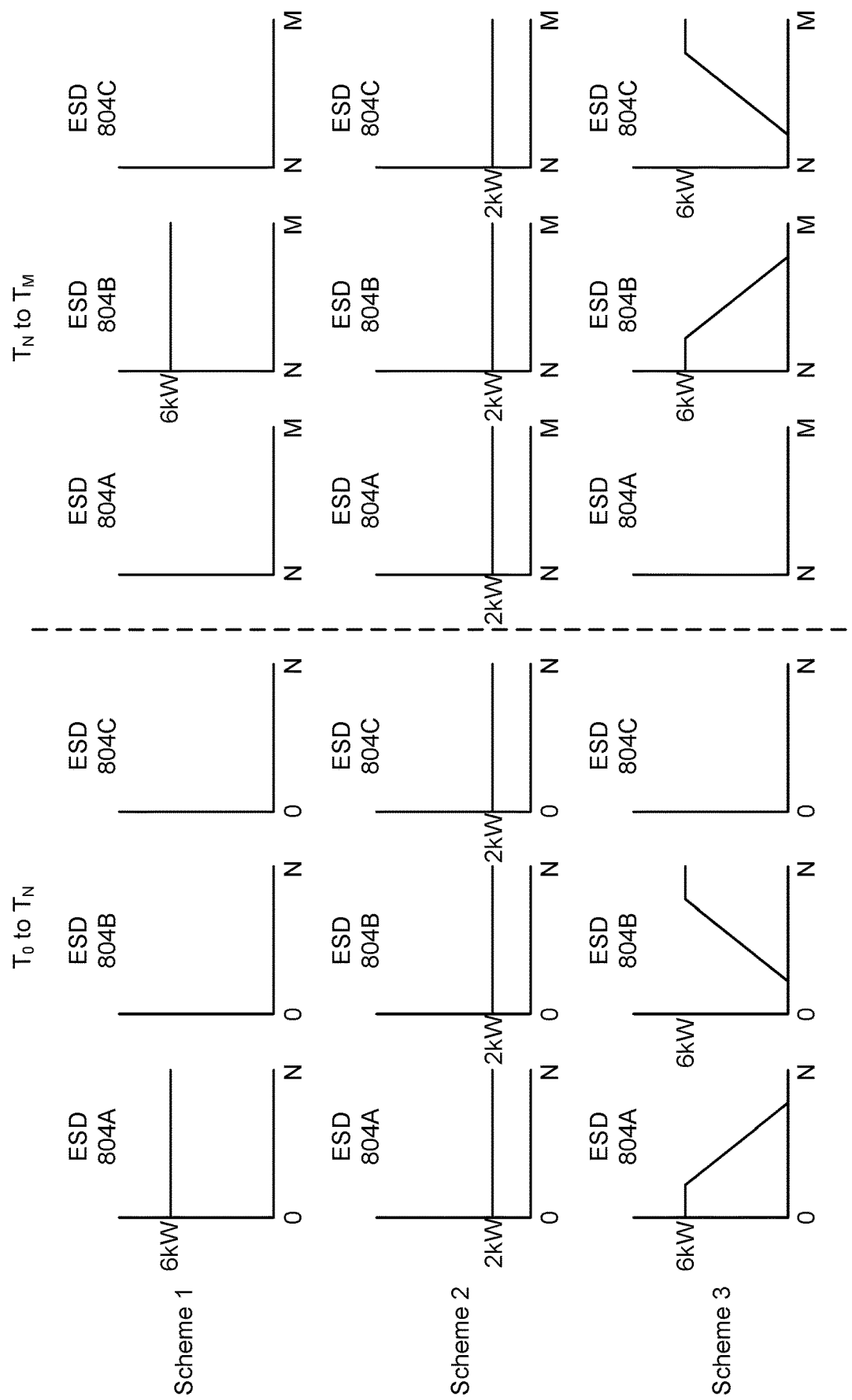
FIG. 10 is a series of charts illustrating various power sharing schemes among multiple energy storage devices during charging/discharging, according to embodiments of the present invention.

FIG. 10 illustrates a series of charts corresponding to different ways of operating energy storage devices 804A-804C as enabled by embodiments of the present invention. Specifically, FIG. 10 illustrates three different schemes for discharging energy storage devices 804A-804C: scheme 1, scheme 2, and scheme 3. Each scheme is represented by two sets of three charts aligned in a row. The three charts represent three energy storage devices, such as energy storage devices (ESD) 804A-804C. Each chart of the first set of three charts has an X axis representing time from $T_0$ to $T_N$, and each chart of the second set of three charts has an X axis representing time from $T_N$ to $T_M$, where N and M are integers and where M is an instance of time after N. The Y axis of all six charts for each scheme represent an output DC power of the corresponding energy storage device. Each of the illustrated schemes may be managed by commands sent from an inverter PCS, such as inverter PCS 806 in FIGS. 7, 8A-8B, and 9. For ease of description, schemes 1-3 output a total of 6,000 watts (W) to inverter PCS 806 from energy storage system 801. It is to be appreciated that energy storage system 801 can output many other magnitudes of wattage, and that 6,000 W is just one example output voltage for discussion purposes.

In embodiments, scheme 1 pertains to a charging/discharging scheme where only one of the energy storage devices is charged/discharged at a time and in a rotational order. For instance, as shown in FIG. 10, from $T_0$ to $T_N$, energy storage device 804A may output 6,000 W while energy storage devices 804B and 804C are outputting 0 W. Thereafter, from $T_N$ to $T_M$, energy storage device 804A may stop outputting 6,000 W and output 0 W, while energy storage device 804B outputs 6,000 W. Each energy storage device may take turns charging/discharging the required amount of power. Taking turns distributes cycling stress amongst the energy storage devices such that one energy storage device is not subjected to more cycling stress than the other energy storage devices, thereby increasing reliability and life of the energy storage devices during continuous operation of the energy storage system.

Scheme 2 pertains to a charging/discharging scheme where all of the energy storage devices are simultaneously charged/discharged and combined to output a desired output power. As an example, from $T_0$ to $T_N$, energy storage devices 804A-804C are each outputting 2,000 W, which may be combined to output 6,000 W to an inverter PCS. Thereafter, from $T_N$ to $T_M$, energy storage devices 804A-804C may continue to output 2,000 W to provide a combined 6,000 W to the inverter PCS. Outputting at a lower power reduces stress subjected to the energy storage devices, and it also charges/discharges the stored energy at a slower rate so that the energy storage devices may provide power for an elongated period of time. Thus, all of the energy storage devices may continually output 2,000 W from $T_0$ to $T_M$. In embodiments, having communication lines organized in a parallel configuration as shown in FIG. 8A enables scheme 2. By allowing controller 824 to directly communicate with energy storage devices 804A-804C, energy storage devices 804A-804C may simultaneously begin charging/discharging 2,000 W at the same time without effects from time delays experienced when communication lines are organized in serial configurations.

Scheme 3 pertains to a charging/discharging scheme where only one of the energy storage devices is discharged at a time and in a rotational order, but the transition between charging/discharging energy storage devices is gradual. For instance, as shown in FIG. 10, energy storage device 804A may output 6,000 W while energy storage devices 804B and 804C are outputting 0 W. At an instance of time between $T_0$ to $T_M$, energy storage device 804A may begin to gradually decrease its outputted power while energy storage device 804B begins to gradually increase its outputted power. The rate at which energy storage device 804A decreases and energy storage device 804B increases may be the same such that the net power output is constant at 6,000 W. This gradual change may repeat as each energy storage device takes turns outputting power. By gradually transitioning between energy storage devices, the power outputted by energy storage devices 804A-804C may be uninterrupted, while ensuring that cycling stress is evenly distributed amongst energy storage devices 804A-804C.

As aforementioned herein, the inverter PCS may control the operation of energy storage devices according to any of schemes 1-3. While embodiments herein enable such complex operations, in some situations, a customer may not want nor afford all of the capabilities of the energy generation system aforementioned herein. In this case, the energy generation system may be simplified to decrease complexity and cost. For example, an energy storage system may be configured such that only one energy storage device may provide power to inverter PCS at one time, as shown in FIG. 11.

D. Simplified Configurations of an Energy Storage System

Figure 11:
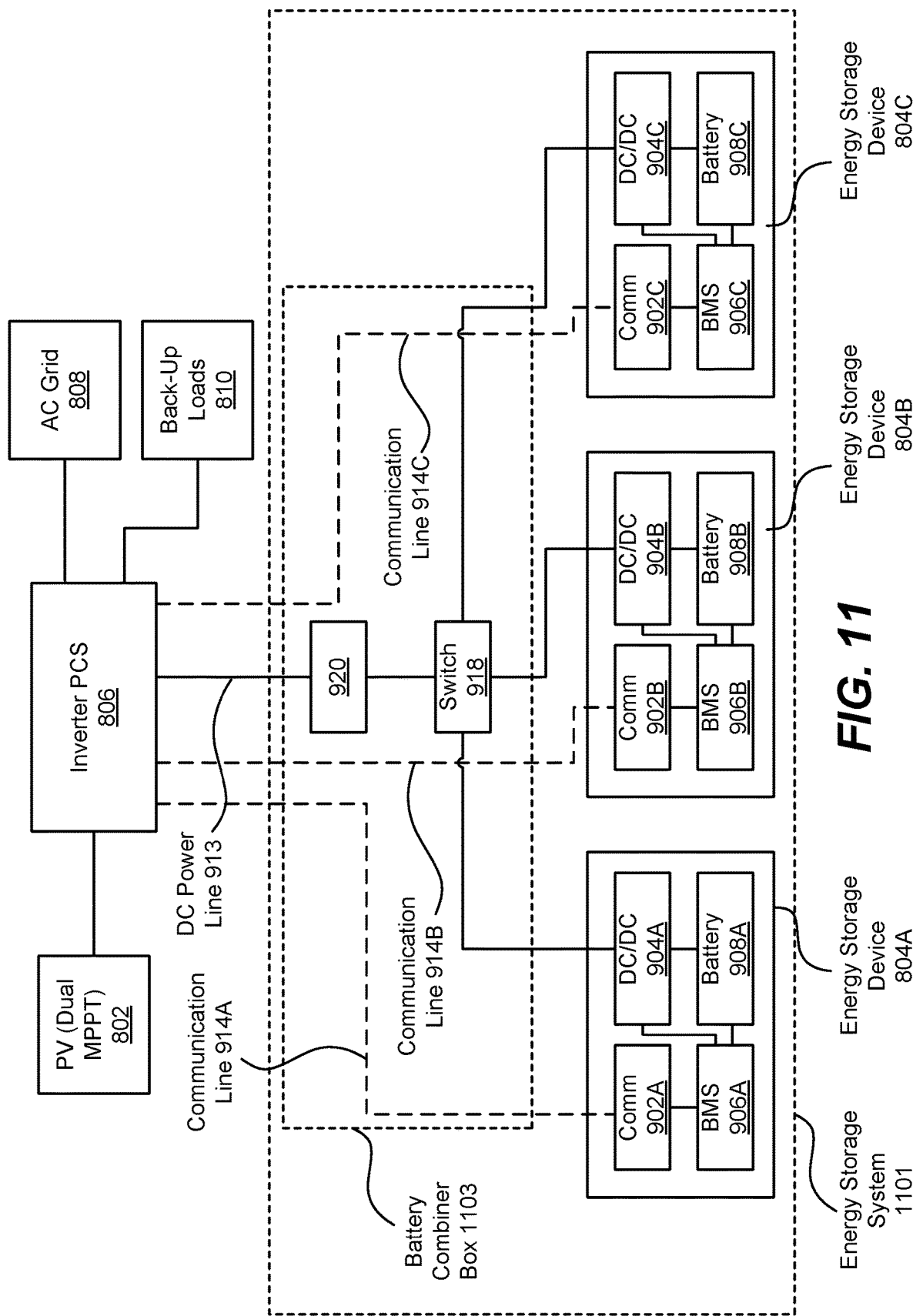
FIG. 11 is a simplified block diagram illustrating details of multiple energy storage devices and a battery combiner box for an energy generation system where the battery combiner box has a multi-pole transfer switch and a single protection component, according to an embodiment of the present invention.

FIG. 11 illustrates one embodiment of the present invention where energy storage system 801 is configured to output power to inverter PCS 806 from only one energy storage device at a time. As shown, battery combiner box 803 may include a multi-position transfer switch 918 for selecting between energy storage devices 804A-804C. Switch 918 may be a two-pole N position transfer switch configured to select between M available energy storage devices, where N and M are integers and N is greater than or equal to M. Switch 918 may be a two-pole switch for positive and negative terminals of the power lines. In the example shown in FIG. 10, switch 918 may be a two-pole three position transfer switch configured to select between three energy storage devices 804A-804C.

In addition to switch 918, battery combiner box 803 may include disconnection and connection component 920. Disconnection and connection component 920 may be similar to disconnection and protection components 910 in FIG. 9 in that they may be configured to selectively prevent transmission of power between an energy storage device and inverter PCS 806. As shown in FIG. 11, disconnection and connection component 920 may be disposed along a power lines between switch 918 and inverter PCS 806. According to the configuration of energy storage system 1101, battery combiner box 1103 may be simpler and cheaper in construction than battery combiner box 803 shown in FIG. 9.

According to an embodiment, an energy generation system may be simplified even more to further reduce complexity and cost. Exemplary energy generation systems with minimal complexity and cost are shown in FIGS. 12 and 13.

Figure 12:
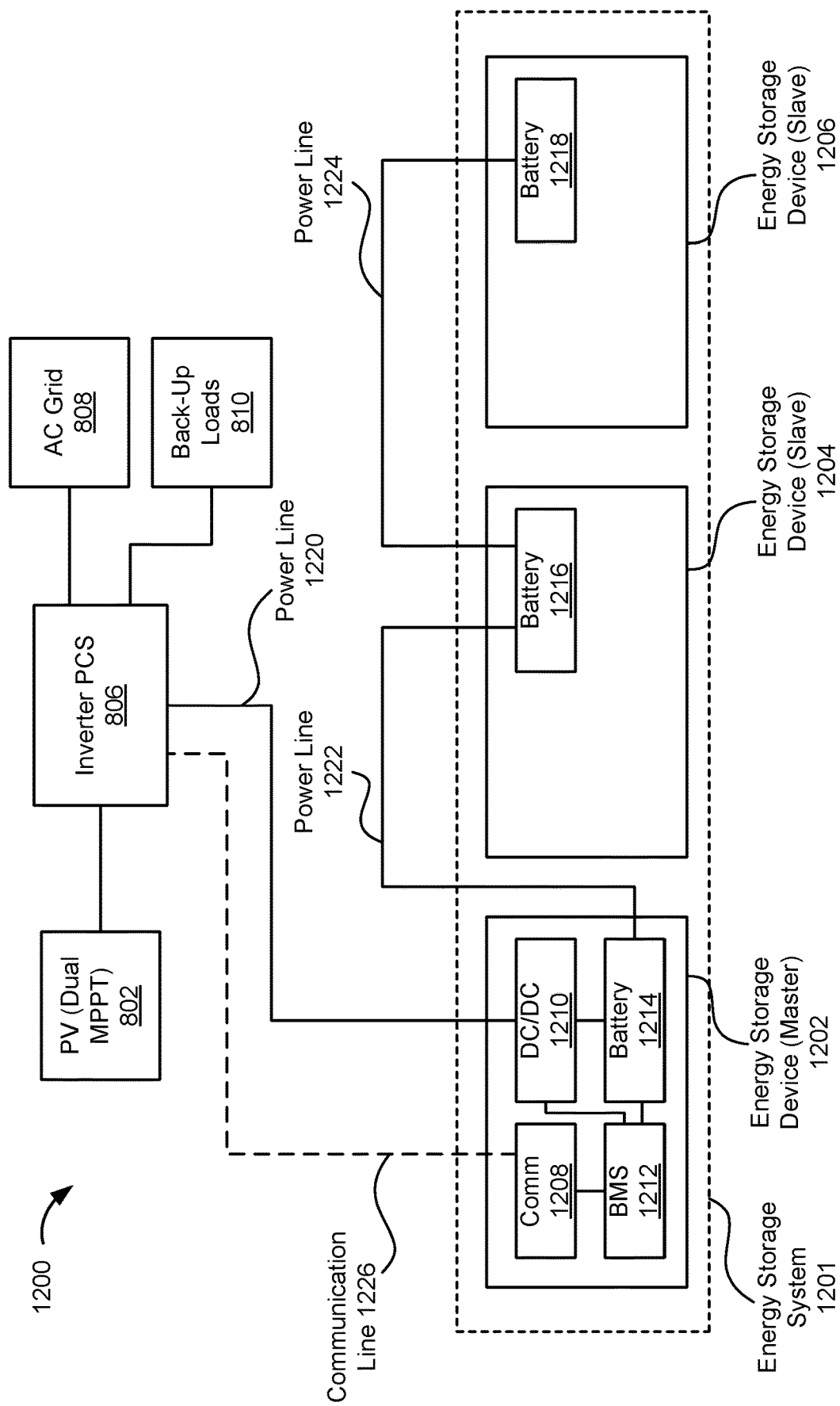
FIG. 12 is a simplified block diagram illustrating a simplified energy storage device having a plurality of energy storage devices connected in a serial configuration, according to one embodiment of the present invention.
Figure 13:
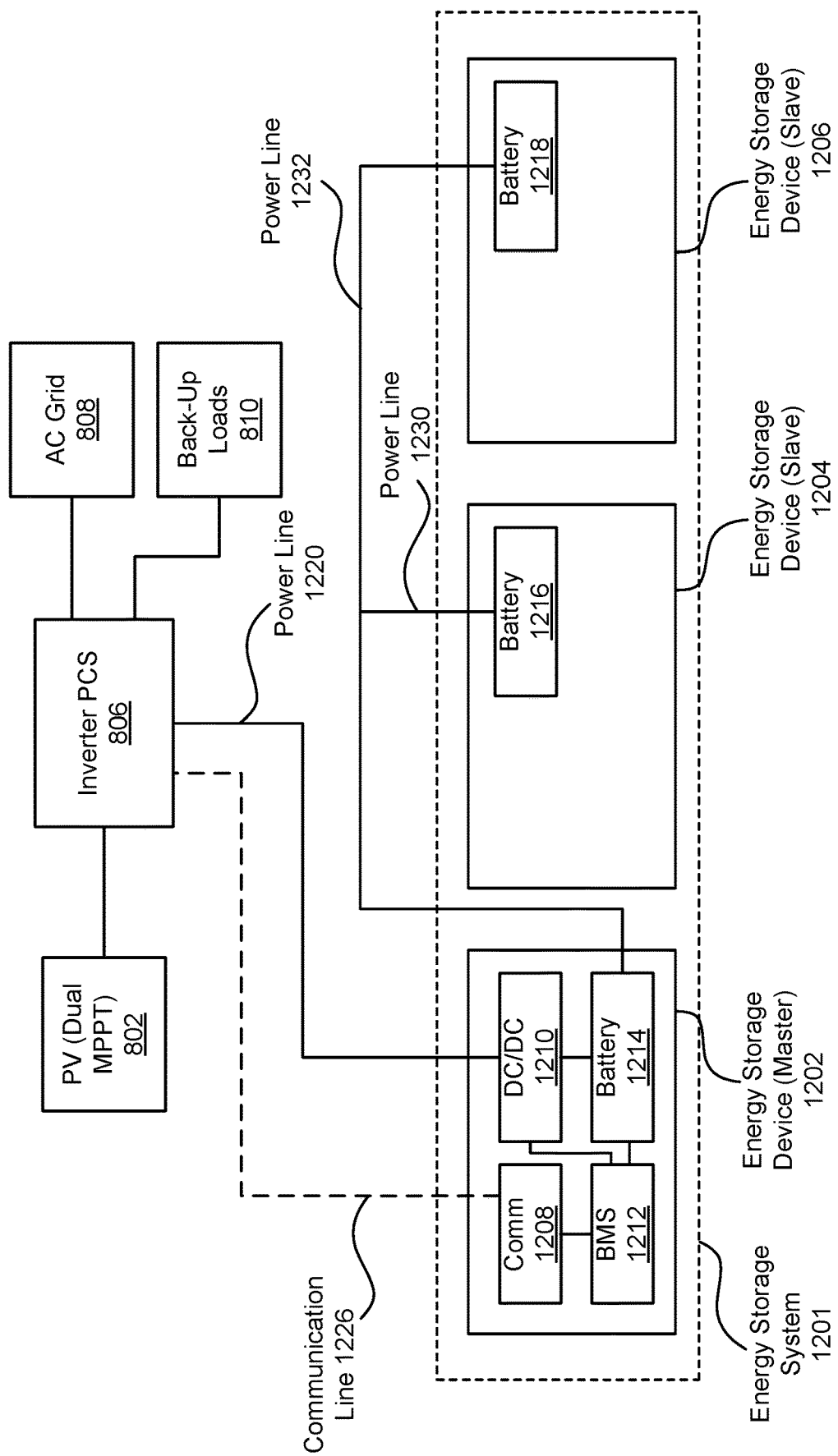
FIG. 13 is a simplified block diagram illustrating a simplified energy storage device having a plurality of energy storage devices connected in a parallel configuration, according to one embodiment of the present invention.

FIG. 12 is a simplified diagram illustrating energy generation system 1200 according to an embodiment of the present invention. As shown, energy generation system 1200 may include PV strings 802 coupled to an inverter PCS 806, which is configured to output AC power to an AC grid 808 or back-up loads 810. Details of such components may be referenced in the discussion herein with respect to FIG. 8.

In addition to the components mentioned above, energy generation system 1200 may also include an energy storage system 1201 containing a plurality of energy storage devices 1202, 1204, and 1206. To minimize cost and complexity of energy storage system 1201, only one of energy storage devices 1202, 1204, and 1206 may be configured to communicate with inverter PCS 806 while the other energy storage devices are merely used to store energy for providing added output power. As an example, energy storage device 1202 may be designated as a master configured to communicate with inverter PCS 806 and output voltage supplied by its own battery 1214 as well as batteries 1216 and 1218 of slave energy storage devices 1204 and 1206, respectively. Master energy storage device 1202 may include a communication device 1208, a battery management system 1212, and a DC/DC converter 1210, while slave energy storage devices 1204 and 1206 include less components than master energy storage device 1202. For instance, slave energy storage devices 1204 and 1206 may merely include an energy storage component (i.e., battery 1216 and 1218, or battery 1216 and BMS 1212). Communication device 1208, battery management system 1212, and DC/DC converter 1210 in master energy storage device 1202 may be similar to corresponding components in energy storage devices 804 discussed herein with respect to FIG. 9.

As shown in FIG. 12, inverter PCS 806 may communicate with master energy storage device 1202 via communication line 1226, and may charge and discharge power from master energy storage device 1202 via power lines 1220. To supply additional power for outputting to inverter PCS 806, one or more power lines may be configured to transfer power from slave energy storage devices 1204 and 1206 to master energy storage device 1202. In one embodiment, master energy storage device 1202 may be serially coupled to slave energy storage devices 1204 and 1206 by power lines 1222 and 1224 as shown in FIG. 12. In such configurations, power from slave energy storage device 1206 may first flow to slave energy storage device 1204, which may combine its output power to the power received from slave energy storage device 1206 and output the combined power to master energy storage device 1202 via power lines 1222. Master energy storage device 1202 may then combine its outputted power with the received combined power from slave energy storage devices 1204 and 1206 to output to inverter PCS 806. DC/DC converter 1210 in master energy storage device 1202 may regulate the outputted combined power according to commands sent from inverter PCS 806.

In another embodiment, master energy storage device 1202 may be coupled to slave energy storage devices 1204 and 1206 by power lines 1230 and 1232 in a parallel configuration as shown in FIG. 13. In such a configuration, power from slave energy storage devices 1204 and 1206 may directly flow to master energy storage device 1202 without having to flow through intermediary energy storage devices as required in a serial configuration. The received power from slave energy storage devices 1204 and 1206 may be all combined by master energy storage device 1202 and then outputted to inverter PCS 806. DC/DC converter 1210 in master energy storage device 1202 may regulate the outputted combined power according to commands sent from inverter PCS 806.

By having only one master energy storage device 1202 for managing the output of power from energy storage system 1201, controlling the operation of energy storage system 1201 may be simplified as inverter PCS 806 only needs to communicate with master energy storage device 1202. Furthermore, by omitting components, such as communication devices, DC/DC converters, and/or battery management systems in slave energy storage devices 1204 and 1206, the cost of each slave energy storage device 1204 and 1206 is reduced, and ideally minimized, which reduces the total cost of energy generation system 1200. Thus, it is to be appreciated that even through slave energy storage devices 1204 and 1206 may not be able to communicate with inverter PCS 806 or dynamically alter its output voltage according to various charging/discharging schemes as discussed herein with respect to FIG. 10, energy storage system 1201 is simpler to operate and substantially cheaper to manufacture. This may be particularly advantageous for customers who cannot afford, or who have no interest in, the functionalities provided by the more functional energy storage systems discussed herein. It is to be noted that a detailed discussion of energy storage devices mentioned herein may be referenced in U.S. patent application Ser. No. 14/931,648, filed Nov. 3, 2015, which is herein incorporated by reference in its entirety for all purposes.

III. Energy Generation System Configured for Multi-Phase Operation

As can be appreciated by the disclosures above, the aforementioned energy generation systems provide AC power to an AC grid or back-up loads that operate in a single phase. Most common household installation locations in North America have back-up loads that operate on single-phase power; however, installation locations other than common household locations in North America, such as commercial buildings, large apartment complexes, or other locations in different countries may have back-up loads that operate on multi-phase AC power (i.e., three-phase power 208V or 480V). Having back-up loads that operate on multi-phase AC power may require different configurations of energy generation systems, as will be discussed further herein with respect to FIGS. 14, 15, and 16.

A. Waveforms of a Multi-Phase System

To fully understand the differences between multi-phase and single-phase energy generation systems, it may be worthwhile to discuss the fundamental differences between voltage waveforms for a single-phase and multi-phase system. FIGS. 14A and 14B illustrate two charts: chart 1400 and 1401. Chart 1400 in FIG. 14A shows a waveform 1402 representing one period of AC voltage for a single-phase system with time increasing to the right. Single-phase systems operate with only a single wave 1402 of AC power for every unit of time. In the case of 60 cycle (Hz) power common in North America, the period is ⅟60 of a second.

Alternatively, chart 1401 in FIG. 14B shows waveforms 1404, 1406, and 1408 representing one electrical period of AC voltages for a multi-phase system with time increasing to the right. Specifically, chart 1401 is for a balanced three-phase system where waveforms 1404, 1406, and 1408 represent transmission of AC power for each phase of the three-phase system. Three-phase is more efficient and commonly used for high voltage power transmission. Each waveform has the same frequency and voltage amplitude, but the phase at which each waveform propagates is offset by a fraction of one period, which is defined by the reciprocal of the frequency at which each waveform propagates. For three-phase systems, each waveform may be offset by an equal degree of shift, such as a third of the period, e.g., 120° as shown in FIG. 14B.

Multi-phase systems may be advantageous over single-phase systems in that power transfer to loads may be constant, which helps reduce generator and motor vibrations. Additionally, multi-phase systems can produce a rotating magnetic field with a specified direction and constant magnitude, which simplifies the design of electric motors, such as those use in some commercial and residential appliances. Furthermore, in multi-phase system, if one phase fails, the other phases may continue to provide power. The circuits configured to operate with multi-phase systems, particularly three-phase systems, are shown in FIGS. 15A and 15B.

B. Circuits of a Multi-Phase System

Figure 15A:
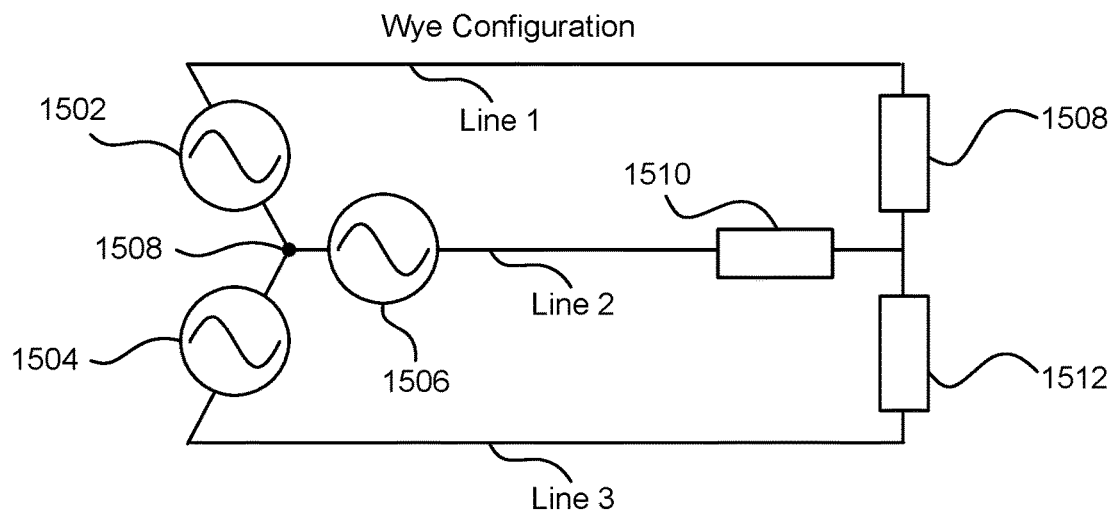
FIG. 15A is a simplified diagram illustrating a circuit implementing a "Wye" configuration for a three-phase energy generation system.
Figure 15B:
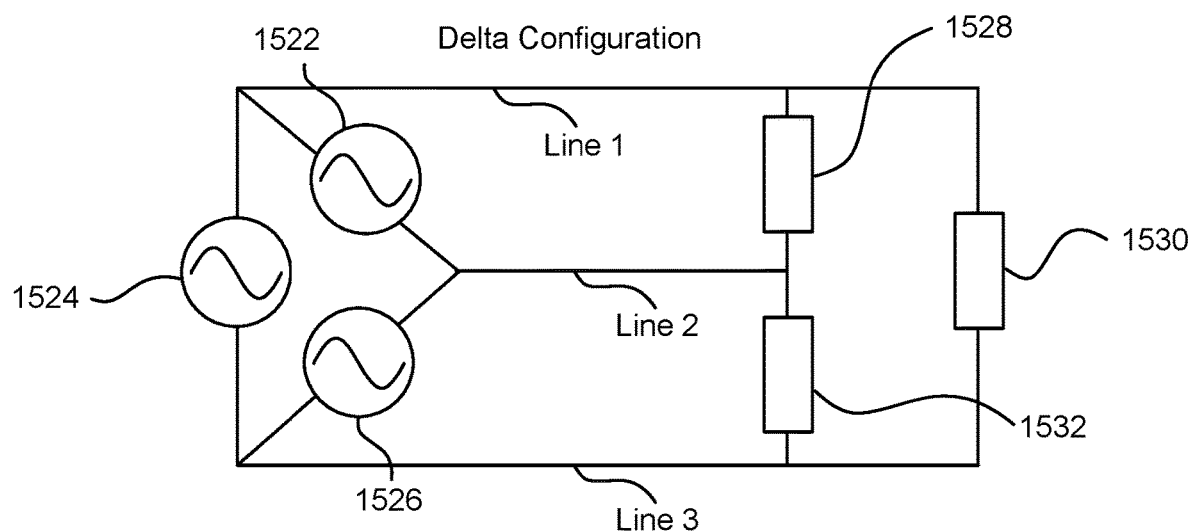
FIG. 15B is a simplified diagram illustrating a circuit implementing a "Delta" configuration for a three-phase energy generation system.

FIGS. 15A and 15B illustrate exemplary circuit configurations for three-phase systems. One configuration is a "Wye" configuration shown in FIG. 15A which includes three AC current sources 1502, 1504, and 1506, each generating an AC waveform that is offset at a phase from the other AC waveforms, as discussed herein with respect to FIG. 14B. AC current sources 1502, 1504, and 1506 may provide AC power to three separate lines: line 1, line 2, and line 3, for driving loads 1508, 1510, and 1512. In the Wye configuration, each AC current source 1502, 1504, and 1506 may be a ground-referenced voltage that shares an optional common neutral node 1508. Each AC current source 1502, 1504, and 1506 may independently output power to a load. For instance, as shown in FIG. 15A, loads 1508, 1510, and 1512 may be separate loads that are driven by separate AC current sources. Thus, if one AC current source were to fail, the other loads may be driven by the other AC current sources that are still operable.

Another configuration is a "Delta" configuration shown in FIG. 15B which includes three AC current sources 1522, 1524, and 1526, each generating an AC waveform offset in phase from one another. AC current sources 1522, 1524, and 1526 may provide AC power to line 1, line 2, and line 3, for driving loads 1528, 1530, and 1532. In the Delta configuration, each AC current source 1502, 1504, and 1506 may be connected in series to form a closed circuit.

As can be appreciated by the Wye and Delta configurations of FIGS. 15A-B, multi-phase operations can be performed by three separate single-phase systems where each single-phase system produces AC power that is offset from one another by a phase. This configuration may be implemented in an energy generation system, as discussed with respect to FIG. 16 herein.

C. Energy Generation System for Multi-Phase Systems

Figure 16:
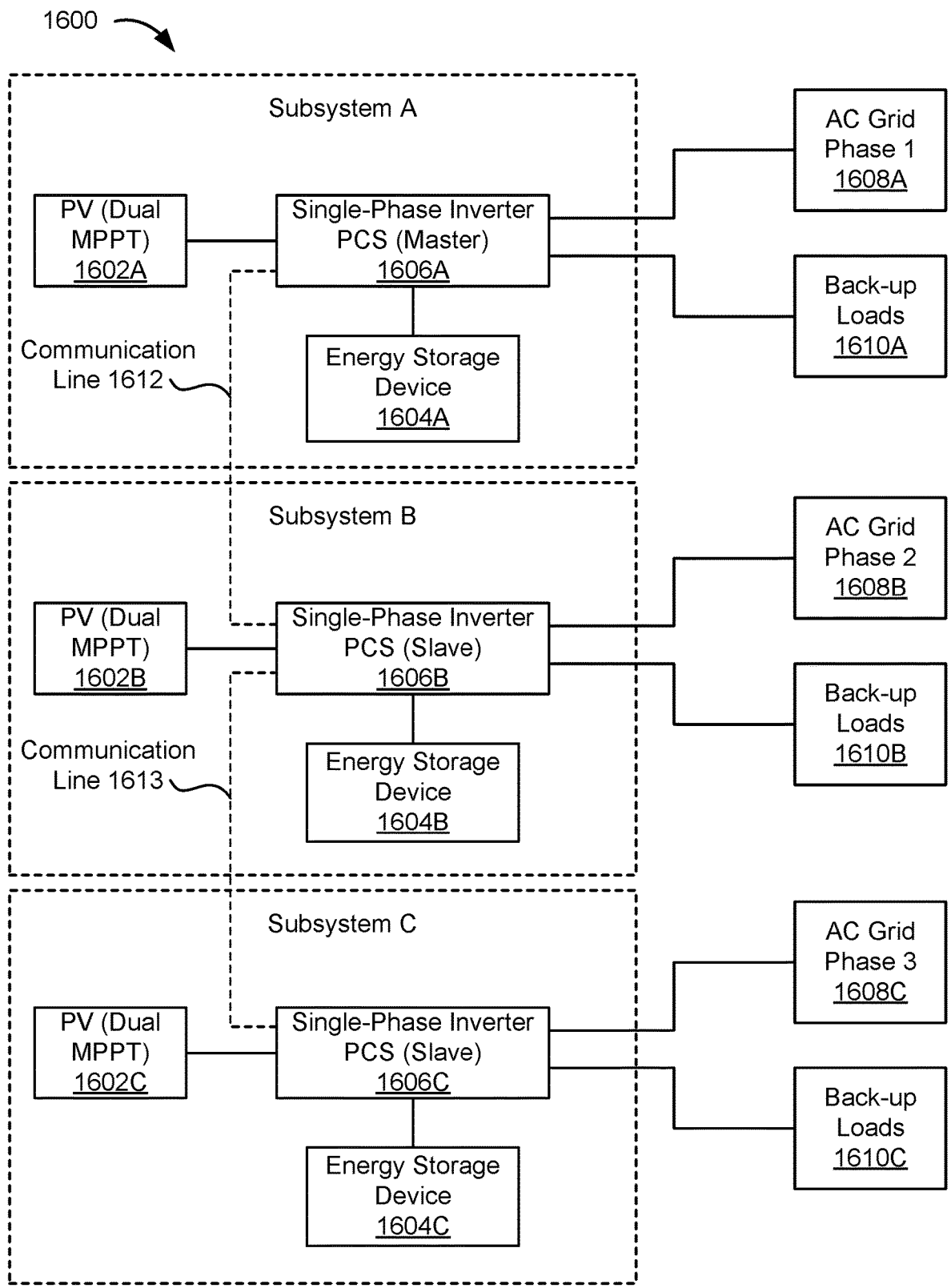
FIG. 16 is a simplified diagram illustrating a three-phase energy generation system, according to embodiments of the present invention.

FIG. 16 is a simplified block diagram illustrating energy generation system 1600 for providing AC power to a multi-phase AC grid or multi-phase back-up loads, according to embodiments of the present invention. Energy generation system 1600 may include three subsystems: subsystem A, subsystem B, and subsystem C, where each subsystem is configured to provide AC power in each phase of the multiple phases. When combined, the three subsystems A, B, and C form a multi-phase system for providing multi-phase power. Multi-phase energy generation system 1600 may be particularly useful for large buildings that span across a large area or demand high amounts of power, or for buildings that are located in regions whose laws require three-phase power systems or that house equipment requiring three-phase power. There may be communication between the three subsystems to coordinate for proper phase balance under three-phase AC grid or back-up loads.

According to embodiments of the present invention, each subsystem may be a single-phase energy generation system having an inverter PCS configured to output single-phase AC power converted from DC power generated from arrays of PV strings or discharged by an energy storage device. For instance, inverter PCS 1606A may be configured to receive DC voltage at an input of the inverter PCS 1606A and may store the DC energy in energy storage device 1604A or convert the received DC energy to single-phase AC power and output the converted single-phase AC power to AC grid 1608A or back-up loads 1610A, each operating at a corresponding single phase. Inverter PCSs 1606A-1060C may be similar in operation and construction to inverter PCSs 306A and 306B discussed herein with respect to FIG. 3.

Outputted AC power from respective inverter PCSs in subsystems A-C may be outputted to AC grid 1608A-1608C or back-up loads 1610A-1610C, respectively. Each respective AC grid may operate in a phase corresponding to a respective subsystem. As an example, single-phase inverter PCS 1606A in subsystem A may be configured to output AC power in phase 1, single-phase inverter PCS 1606B in subsystem B may be configured to output AC power in phase 2, and single-phase inverter PCS 1606C in subsystem C may be configured to output AC power in phase 3. The phases 1-3 may each be outputted to respective AC grids 1608 or back-up loads 1610. Thus, each inverter PCS 1606A-1606C in multi-phase energy generation system 1600 may correspond to the AC sources discussed herein with respect to FIGS. 15A and 15B. In embodiments, back-up loads for each subsystem may be different loads in an installation site. As an example, back-up loads 1610A may be appliances in a kitchen, back-up loads 1610B may be devices in a bedroom, and back-up loads 1610B may be lighting at the installation site.

Phases of output AC power from subsystems A-C may be offset from one another, as discussed herein with respect to FIG. 14B. Thus, inverter PCSs may need to be coordinated with one another such that no two inverter PCSs are outputting at the same phase. To coordinate the phases of AC outputs, one inverter PCS may be designated as a master while the other inverter PCSs are designated as slaves. As shown in FIG. 16, inverter PCS 1606A may be designated as a master, and inverter PCSs 1606B and 1606C may be designated as slaves. Master inverter PCS may be configured to manage the operations of slave inverter PCSs 1606B and 1606C by sending commands to and receiving status information from slave inverter PCSs 1606B and 1606C through communication lines 1612 and 1613. For instance, master inverter PCS 1606A may output AC power in phase 1, and may send a command to slave inverter PCS 1606B to output AC power in phase 2, and a command to slave inverter PCS 1606C to output AC power in phase 3. Thus, outputted AC power from subsystems A-C may form a multi-phase system including phases 1-3.

Multi-phase energy generation systems are more robust and flexible than single-phase energy generation systems. For example, operating an energy generation system configured for multi-phase operation may be capable of outputting AC power even when one of the subsystems fails. For example, array of PV strings 1602B and/or energy storage device 1604B of subsystem B may fail during operation of energy generation system 1600. In this case, subsystem B may not be capable of outputting AC power to AC grid 1608B or back-up loads 1610B. While subsystem B may not be able to output AC power in phase 2, subsystems A and C may still be capable of outputting AC power in phases 1 and 3. Additionally, operating an energy generation system configured for multi-phase operation may be capable of outputting different magnitudes of AC power to different AC grids or on-site back-up loads. Outputting different magnitudes of AC power may be suitable for instances where voltage imbalance is detected in the multi-phase system. The different magnitudes of outputted voltage may compensate for the voltage imbalance (i.e., re-balancing the multi-phase system), thereby minimizing damage to one or more loads.

Although FIG. 16 illustrates communication lines 1612 and 1613 are arranged in a serial configuration, embodiments of the invention need not be so limited. Other embodiments may have communication lines 1612 and 1613 arranged in a parallel configuration, or any other suitable configuration suitable for allowing master single-phase inverter PCS 1606A to communicate with slave single-phase inverter PCSs 1606B and 1606C.

What is claimed is:

1. An energy generation system, comprising:
   an inverter power control system comprising:
   an input configured to receive DC power;
   a DC/AC inverter stage configured to receive the DC power input;
   an anti-islanding relay coupled to the output of the DC/AC inverter stage; and
   a transition relay coupled to the anti-islanding relay, the transition relay configured to route an output of the inverter power control system between one or more onsite back-up loads and an AC grid;
   a plurality of separate energy storage devices coupled to the inverter power control system, wherein the plurality of seperate energy storage devices are directly coupled to the inverter power control system via respective individual communication lines, and configured to be controlled by the inverter power control system through the individual communication lines; and
   a battery combiner box individually and separately coupled to each seperate energy storage device of the plurality of separate energy storage devices, wherein the battery combiner box is coupled between the plurality of separate energy storage devices and the inverter power control system, and provides combined power to the inverter power control system, and wherein the individual communication lines are coupled to the energy storage devices through the battery combiner box.

2. The energy generation system of claim 1, wherein the battery combiner box is configured to combine DC power outputted by the plurality of energy storage devices into a DC power bus.

3. The energy generation system of claim 1, wherein the battery combiner box includes one or more disconnection and protection components configured to sever a flow of power between an energy storage device and the inverter power control system.

4. The energy generation system of claim 1, wherein each of the plurality of energy storage devices comprises a DC/DC converter to step up or step down a voltage of the output of the inverter power control system.

5. The energy generation system of claim 1, wherein the individual communication lines are arranged in a parallel configuration.

6. The energy generation system of claim 5, wherein the communication lines are wireless communication lines.

7. The energy generation system of claim 5, wherein the communication lines are power lines though which power is transferred.

8. The energy generation system of claim 7, wherein the inverter power control system communicates with the plurality of energy storage devices through power line communication.

9. An energy generation system, comprising:
an inverter power control system configured to route power between an AC grid and one or more back-up loads;
a plurality of PV panels to input DC power to the inverter power control system;
a plurality of energy storage devices coupled to the inverter power control system, the plurality of energy storage devices comprising:
a master energy storage device comprising a buck-boost circuit and a communication circuit for communicating with the inverter power control system; and
at least one slave energy storage device coupled to the master energy storage device, wherein the at least one slave energy storage device is controlled by the master energy storage device, the master energy storage device and the at least one slave energy storage device are directly coupled to the inverter power control system via respective individual communication lines, and configured to be controlled by the inverter power control system through the communication lines; and
a battery combiner box individually and separately coupled to each energy storage device of the plurality of separate energy storage devices, wherein the battery combiner box is coupled between the plurality of energy storage devices and the inverter power control system, and provides combined power to the inverter power control system, and wherein the individual communication lines are coupled to the energy storage devices through the battery combiner box.

10. The energy generation system of claim 9, wherein the at least one slave energy storage device is coupled to the master energy storage device through power lines arranged in a parallel configuration.

11. The energy generation system of claim 9, wherein the at least one slave energy storage device is coupled to the master energy storage device through power lines arranged in a serial configuration.

12. The energy generation system of claim 9, wherein each slave energy storage device has less components than the master energy storage device.

13. A method, comprising:
receiving direct current (DC) power at an inverter power control system;
generating commands by a controller in the inverter power control system;
sending the commands from the controller to a plurality of separate energy storage devices through one or more communication lines; and
receiving, by the plurality of separate energy storage devices, the commands from the inverter power control system, the commands instructing the plurality of energy storage devices to charge or discharge according to a charge or discharge scheme, wherein the plurality of energy storage devices are directly coupled to the inverter power control system via respective individual communication lines, and configured to be controlled by the inverter power control system through the communication lines, and wherein each energy storage device of the plurality of separate energy storage devices is individually and separately coupled to a battery combiner box coupled between the plurality of separate energy storage devices and the inverter power control system for providing combined power to the inverter power control system, and wherein the individual communication lines are coupled to the energy storage devices through the battery combiner box.

14. The method of claim 13, wherein the commands are sent simultaneously to each energy storage device of the plurality of energy storage devices through the one or more communication lines arranged in a parallel configuration.

15. The method of claim 13, wherein the commands are sent in sequential order to each energy storage device of the plurality of energy storage devices through the one or more communication lines.

16. The method of claim 13, wherein the charge or discharge scheme charges or discharges one energy storage device at a time and in a sequential order.

17. The method of claim 16, wherein a transition of power between sequential energy storage devices comprises:
gradually decreasing a power output of one energy storage device while gradually increasing a power output of another energy storage device.

18. The method of claim 16, wherein a transition of power between sequential energy storage devices comprises:
equally charging or discharging each energy storage device of the plurality of energy storage devices at a same rate.

* * * * *